(12) United States Patent
Kawakami et al.

(10) Patent No.: US 12,542,886 B2
(45) Date of Patent: *Feb. 3, 2026

(54) THREE-DIMENSIONAL CONTENT DISTRIBUTION SYSTEM, THREE-DIMENSIONAL CONTENT DISTRIBUTION METHOD AND COMPUTER PROGRAM

(71) Applicant: DWANGO Co., Ltd., Tokyo (JP)

(72) Inventors: Nobuo Kawakami, Tokyo (JP); Shinnosuke Iwaki, Tokyo (JP); Takashi Kojima, Tokyo (JP); Hiroaki Saito, Tokyo (JP)

(73) Assignee: DWANGO CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,264

(22) Filed: Jun. 10, 2024

(65) Prior Publication Data

US 2024/0333902 A1   Oct. 3, 2024

Related U.S. Application Data

(63) Continuation of application No. 17/059,677, filed as application No. PCT/JP2019/029107 on Jul. 24, 2019, now Pat. No. 12,041,218.

(30) Foreign Application Priority Data

Jul. 25, 2018   (JP) ................. 2018-150863

(51) Int. Cl.
*H04N 13/189* (2018.01)
*G06V 40/10* (2022.01)
(Continued)

(52) U.S. Cl.
CPC ......... *H04N 13/189* (2018.05); *G06V 40/103* (2022.01); *G06V 40/23* (2022.01);
(Continued)

(58) Field of Classification Search
CPC .. H04N 13/189; H04N 13/117; H04N 13/178; H04N 13/194; H04N 21/234;
(Continued)

(56) References Cited

U.S. PATENT DOCUMENTS 9,358,456 B1 * 6/2016 Challinor ................ A63F 13/44
9,804,696 B2 * 10/2017 Hall .................... G06F 3/0346
(Continued)

FOREIGN PATENT DOCUMENTS

CN        1849628 A     10/2006
JP      200128765 A      1/2001
(Continued)

OTHER PUBLICATIONS

Translation of International Search Report and Written Opinion dated Sep. 17, 2019 in corresponding application No. PCT/JP2019/029107; 8 pgs.
(Continued)

*Primary Examiner* — Thai Q Tran
*Assistant Examiner* — Stephen R Smith
(74) *Attorney, Agent, or Firm* — Maier & Maier, PLLC

(57) ABSTRACT

The present disclosure causes live content to be drawn on the basis of specification data on a virtual object, operation data on the virtual object, and the like, and causes the drawn content to be provided for viewing reproduction on a terminal for viewing.

10 Claims, 17 Drawing Sheets

(51) Int. Cl.
*G06V 40/20* (2022.01)
*H04N 13/117* (2018.01)
*H04N 13/178* (2018.01)
*H04N 13/194* (2018.01)

(52) U.S. Cl.
CPC ......... *H04N 13/117* (2018.05); *H04N 13/178* (2018.05); *H04N 13/194* (2018.05)

(58) Field of Classification Search
CPC .... H04N 21/235; G06V 40/103; G06V 40/23; G06F 13/00; G06T 19/00
USPC .............. 348/43, 51, 143; 382/305; 715/782
See application file for complete search history.

(56) References Cited

U.S. PATENT DOCUMENTS

| | | | |
|---|---|---|---|
| 2003/0090523 | A1 | 5/2003 | Hayashi et al. |
| 2011/0221865 | A1* | 9/2011 | Hyndman ............ H04N 19/164 348/E13.001 |
| 2015/0325029 | A1* | 11/2015 | Li ............................. G06T 7/20 382/103 |
| 2017/0103672 | A1* | 4/2017 | Dey ....................... G06F 3/0304 |
| 2017/0339372 | A1* | 11/2017 | Valli ...................... G06T 15/005 |
| 2018/0199023 | A1* | 7/2018 | Ishikawa ............. H04N 13/128 |
| 2018/0373413 | A1* | 12/2018 | Sawaki ................. H04N 13/332 |
| 2019/0104235 | A1* | 4/2019 | Sarkar ................... H04N 21/47 |
| 2019/0130631 | A1* | 5/2019 | Gebbie ................... G06T 7/536 |
| 2019/0176043 | A1* | 6/2019 | Gosine .................. A61B 5/1114 |
| 2019/0333261 | A1* | 10/2019 | Nakashima ............ G06F 3/011 |
| 2019/0385476 | A1* | 12/2019 | Sadeghi ............. A63B 24/0062 |
| 2020/0058148 | A1* | 2/2020 | Blaylock ................. G06T 7/251 |
| 2020/0388052 | A1* | 12/2020 | Fukasawa ............. A63F 13/428 |
| 2021/0014468 | A1* | 1/2021 | Takahashi ................. G06T 7/75 |
| 2021/0166479 | A1* | 6/2021 | Fukumoto ............. A61B 5/1114 |

FOREIGN PATENT DOCUMENTS

| | | |
|---|---|---|
| JP | 2008117042 A | 5/2008 |
| JP | 2012120098 A | 6/2012 |
| JP | 2012226669 A | 11/2012 |
| JP | 5231093 B2 | 7/2013 |
| JP | 6276882 B1 | 1/2018 |
| JP | 201894326 A | 6/2018 |
| WO | 02093497 A1 | 11/2002 |

OTHER PUBLICATIONS

Decision to Grant a Patent issued on Apr. 21, 2020 in corresponding Japanese application No. 2018-150863; 5 pgs.
Decision of Refusal issued on Jan. 21, 2020 in corresponding Japanese application No. 2018-150863; 2 pgs.
Notice of Reasons for Refusal issued on Oct. 29, 2019 in corresponding Japanese application No. 2018-150863; 6 pgs.
Notice of Reasons for Refusal issued on Jun. 18, 2019 in corresponding Japanese application No. 2018-150863; 6 pgs.
Office Action issued on Jan. 30, 2024, in corresponding Chinese Application No. 201980039636.8, 12 pages.
Office Action issued on Dec. 10, 2024, in corresponding Chinese Application No. 201980039636.8; 9 pages.

* cited by examiner

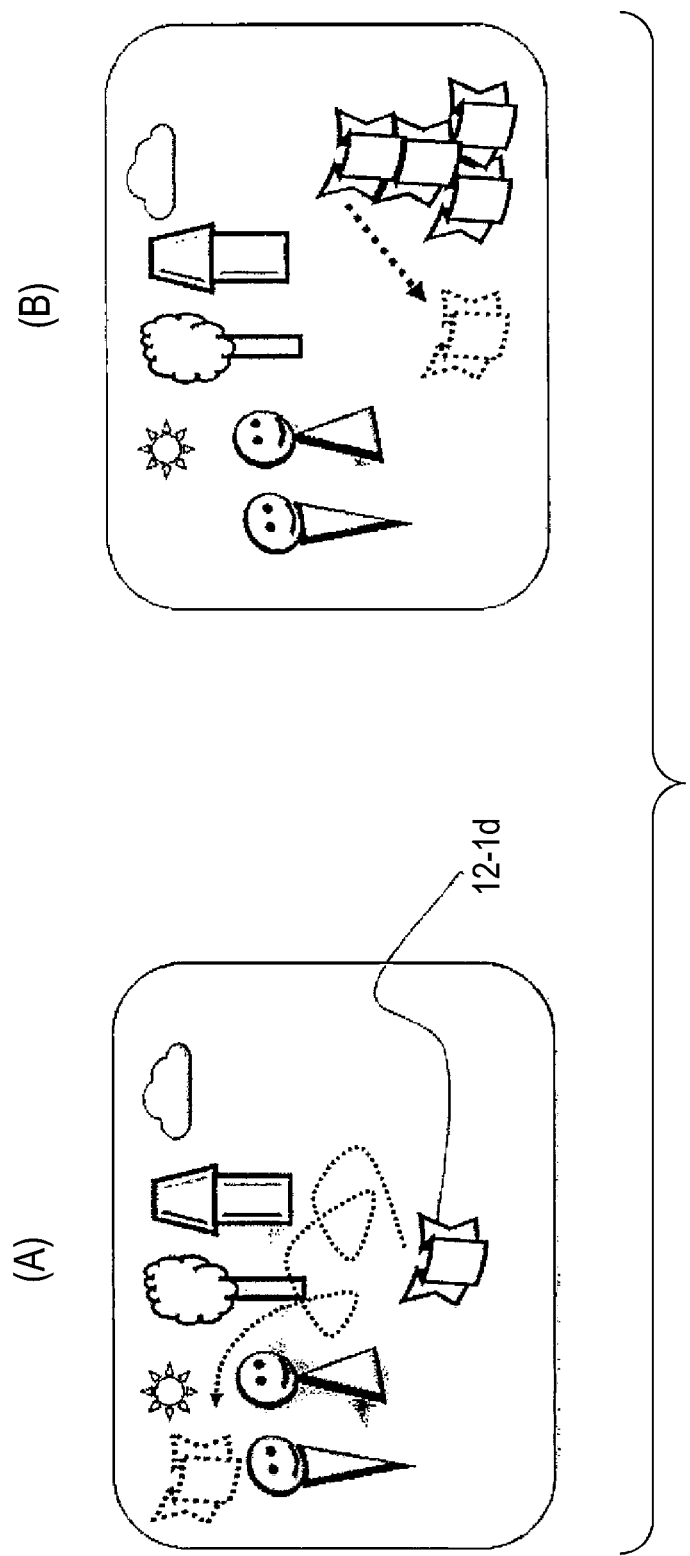

THREE-DIMENSIONAL CONTENT
DISTRIBUTION SYSTEM,
THREE-DIMENSIONAL CONTENT
DISTRIBUTION METHOD AND COMPUTER
PROGRAM

CROSS-REFERENCE TO RELATED
APPLICATIONS

This application is a continuation of U.S. application Ser. No. 17/059,677, filed on Nov. 30, 2020, which is a national phase application of International Application No. PCT/JP2019/029107, filed on Jul. 24, 2019, which is based on and claims priority to Japanese Application No. 2018-150863, filed on Jul. 25, 2018, contents of all of which is incorporated herein by reference.

FIELD

The present disclosure relates to a three-dimensional content distribution system, a three-dimensional content distribution method, and a computer program.

BACKGROUND

Recently, a service for distributing a live content through a network has prevailed as internet live broadcasting. In such internet live broadcasting, a technology has been proposed in which a distributor appears in a virtual space as a virtual character (an avatar), and an image thereof is distributed as a live content. In such a live content, an image in which the operation of the distributor is synthesized as the operation of the virtual character is distributed by a motion capture technology.

For example, in Patent Document 1, a configuration is disclosed in which backgrounds, figures, virtual objects, and the like are respectively transmitted to a terminal for viewing from a broadcasting station through different dedicated channels, as broadcasting material data, and a viewer selects the own desired material from the transmitted materials and produces the own three-dimensional image, as a configuration in which a viewer generates the own reproduction image unlike a configuration in which a live content is distributed through a network, and the produced three-dimensional image is not shared with the other viewer.

In addition, similarly, in Patent Document 2 that is a configuration in which a viewer generates the own reproduction image, a configuration is disclosed in which virtual three-dimensional content data such as a soccer match is prepared in advance, moving object data such as a plurality of players, a referee, and a ball, and background data such as a goal or the ground are included in the content data, and in a case where the viewer selects a viewpoint that the viewer wants to view (for example, a specific player or a camera out of the field), a server renders an image viewed from the viewpoint, and transmits the image to a terminal of the viewer, and as with Patent Document 1, the viewer produces the own three-dimensional image, and the obtained rendering image is not shared with the other viewer.

In addition, in Patent Document 3, a configuration is disclosed in which a two-dimensional video content such as live performance is prepared in advance in a server, regarding a planar moving image content that is not in a three-dimensional (3D) virtual space, a viewer receives the data from the server and adds the own avatar (a two-dimensional image of an audience) to a reproduction image while reproducing the data, data of the avatar that is added by the viewer is sent to the server and is added and updated to the two-dimensional video content, and after or during the reproduction, the other viewer is capable of viewing the avatar at the time of the reproduction. As a result thereof, every time when each of the viewers performs the reproduction, the avatars of the viewers are added to the content, and an image of the content becomes bustling.

CITATION LIST

Patent Document

Patent Document 1: JP-A-2001-28765
Patent Document 2: JP-A-2008-117042
Patent Document 3: Japanese Patent No. 5,231,093
Patent Document 4: JP-A-2012-120098

SUMMARY

Recently, viewers enjoying a live content by internet live broadcasting or the like have increased, and as a new need, there are a demand for viewing and enjoying a live content later, which was not capable of being viewed when the live broadcasting was performed, and a demand for obtaining a realistic sensation and a sense of immersion as if viewing a live content, even in the later viewing reproduction.

Such a desire of "obtaining a realistic sensation and a sense of immersion as if viewing a live content" is considered, at a glance, to be contrary to the other desire of "viewing and enjoying a live content later, which was not capable of being viewed when the live broadcasting was performed", and in Patent Document 1 and Patent Document 2 described above, only an image that is viewed by the viewer itself is generated, and thus, such desires are not satisfied.

Further, in Patent Document 3, the avatar that is the viewer itself and is a two-dimensional image is added to the image as the audience of the live content that is a two-dimensional image, and an image of the own avatar or an image of an avatar added by the other viewer is visible by all of the viewers, but the own two-dimensional avatar image is simply superimposed on the content that is a two-dimensional image, and the viewer itself is not capable of virtually participating in the live content, and thus, a difficulty of obtaining a sufficient sense of connectedness, a sufficient sense of exaltation, and a sufficient sense of immersion has not been solved.

Further, other issues according to the technology of the related art include decreasing a load on a communication network or each terminal hardware and enjoying the viewing of a live content while sharing the live content with a plurality of viewers.

In Patent Document 1 and Patent Document 2 described above, the live content for enjoying while being shared with the plurality of viewers is not provided, and similarly, in Patent Document 3, the content is a content including a two-dimensional planar moving image, and thus, a load is applied on a communication path or a terminal necessary for general broadcasting distribution of a moving image.

The invention has been made in consideration of the circumstances described above, and an object thereof is to provide a three-dimensional content distribution system, a three-dimensional content distribution method, and a computer program, in order to resolve the issues such as viewing and enjoying a live content later, which was not capable of being viewed when the live broadcasting was performed, obtaining a realistic sensation and a sense of immersion as if viewing a live content, even in the later viewing reproduction, or enjoying the viewing of a live content while sharing the live content with a plurality of viewers by decreasing a load on a communication network or each terminal hardware.

In order to resolve the issues described above, the invention provides a three-dimensional content distribution system, a three-dimensional content distribution method, and a computer program according to 1) to 11) described below.

1)

A three-dimensional content distribution system distributing a content using a virtual three-dimensional virtual space to a terminal for viewing to be provided for viewing, the system including:
  a recording unit recording content data including at least (A) first data relevant to a specification of each virtual object disposed in the three-dimensional virtual space and (B) second data relevant to an operation of each of the virtual objects; and
  a generating unit generating image data for viewing by using at least the first data and the second data, in accordance with a request for the terminal for viewing to perform the viewing.

2)

The three-dimensional content distribution system according to 1), in which the recording unit further records (C) third data relevant to a viewpoint disposed in the three-dimensional virtual space, and the generating unit performs the generation also by using the third data.

3)

The three-dimensional content distribution system according to 1) or 2), in which the first data and the second data that are recorded by the recording unit are data that is initially recorded during an initial network distribution of the content.

4)

The three-dimensional content distribution system according to any one of 1) to 3), the system further including: a change accepting unit generating new content data by performing a change for adding or correcting at least any one of the first data and the second data, in accordance with a change request from the terminal for viewing that performs the viewing, to be provided for the subsequent viewing.

5)

The three-dimensional content distribution system according to 2), the system further including:
  a change accepting unit generating new content data by performing a change for adding or correcting at least any one of the first data and the second data, in accordance with a change request from the terminal for viewing that performs the viewing, to be provided for the subsequent viewing,
  in which the change accepting unit further generates new content data by performing a change for adding or correcting the third data, to be provided for the subsequent viewing.

6)

A three-dimensional content distribution method for distributing a content using a virtual three-dimensional virtual space to a terminal for viewing to be provided for viewing, the method including:
  a recording step of recording content data including at least (A) first data relevant to a specification of each virtual object disposed in the three-dimensional virtual space and (B) second data relevant to an operation of each of the virtual objects; and
  a generating step of generating image data for viewing by using at least the first data and the second data, in accordance with a request for the terminal for viewing to perform the viewing.

7)

The three-dimensional content distribution method according to 6), in which in the recording step, (C) third data relevant to a viewpoint disposed in the three-dimensional virtual space is further recorded, and in the generating step, the generation is performed also by using the third data.

8)

The three-dimensional content distribution method according to 6) or 7), in which the first data and the second data that are recorded in the recording step are data that is initially recorded during an initial network distribution of the content.

9)

The three-dimensional content distribution method according to any one of 6) to 8), the method further including:
  a change accepting step of generating new content data by performing a change for adding or correcting at least any one of the first data and the second data, in accordance with a change request from the terminal for viewing that performs the viewing, to be provided for the subsequent viewing.

10)

The three-dimensional content distribution method according to 7), the method further including:
  a change accepting step of generating new content data by performing a change for adding or correcting at least any one of the first data and the second data, in accordance with a change request from the terminal for viewing that performs the viewing, to be provided for the subsequent viewing,
  in which in the change accepting step, new content data is further generated by performing a change for adding or correcting the third data, to be provided for the subsequent viewing.

11)

A computer program for allowing a computer to execute:
  each of the steps of the three-dimensional content distribution method according to any one of 6) to 10).

BRIEF DESCRIPTION OF THE DRAWINGS

FIG. 18 is a schematic view illustrating an example in which a virtual object is added to a virtual space, in the content distribution receiving system of the invention.

DETAILED DESCRIPTION

Hereinafter, an embodiment according to the disclosure will be described. Note that, this embodiment described below is merely an example, various modifications can be made within a range not departing from the spirit of the invention, and such modifications are also included in the invention.

[Configuration of Content Distribution Receiving System 1]

Figure 1:
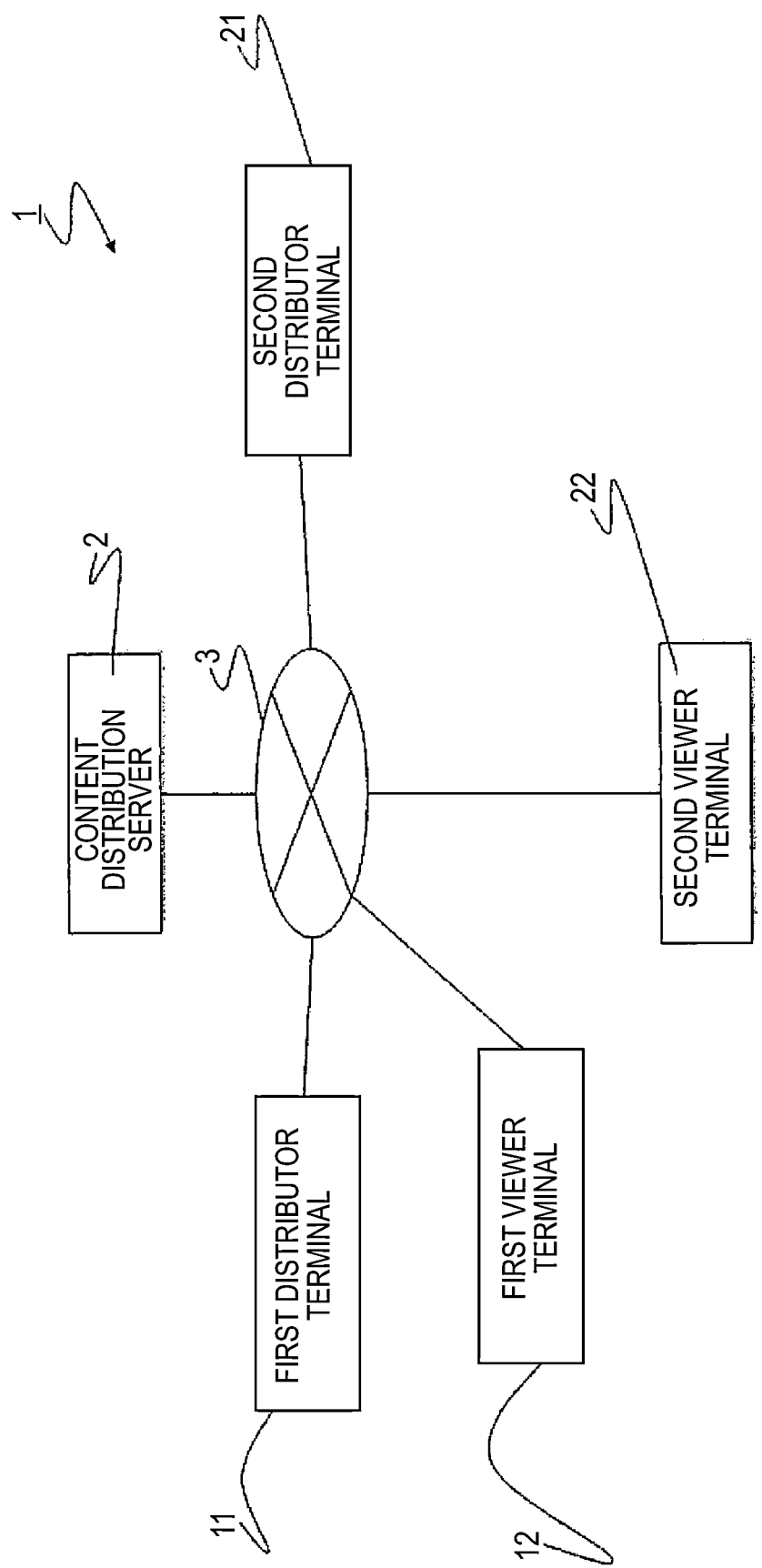
FIG. 1 is a diagram schematically illustrating a configuration of a content distribution receiving system according to the invention.

FIG. 1 is a diagram schematically illustrating the configuration of a content distribution receiving system 1 according to the invention.

The content distribution receiving system 1 includes a content distribution server 2, a first distributor terminal 11, a first viewer terminal 12, a second distributor terminal 21, and a second viewer terminal 22, and such configurations are connected to each other through an internet communication network 3 or the other communication network such that data exchange can be performed. The content distribution server 2 is a server that is operated by a general-purpose computer with a computer program dedicated to this system 1.

The first distributor terminal 11, for example, is a personal computer that is used in internet live broadcasting that is a distribution of a live content using a virtual space 30 described below and is used by a distributor staging the live content. The first viewer terminal 12, for example, is a personal computer that is used by a viewer viewing the live content described above as a reproduction content after live broadcasting is ended, or may be attained by using various information terminals such as a smart phone or a personal digital assistant (PDA).

As described below, the second distributor terminal 21 is a personal computer that is used in the distribution of the live content in which the live content once subjected to a live broadcasting distribution is provided again to the internet live broadcasting in the form of reproduction, and is used by the distributor staging the live content. The second viewer terminal 22, for example, is a personal computer that is used by the viewer viewing the live content described above in the form of the reproduction content or the internet live broadcasting, or may be attained by using various information terminals such as a smart phone or a personal digital assistant (PDA).

Note that, in order to simplify and clarify the configuration illustrated in FIG. 1 and the above description, the number of terminals to be configured is limited, but in the implementation, it is obvious that a larger number of distributor terminals and a larger number of viewer terminals can be included.

[Configuration of Content Distribution Server 2]

Figure 2:
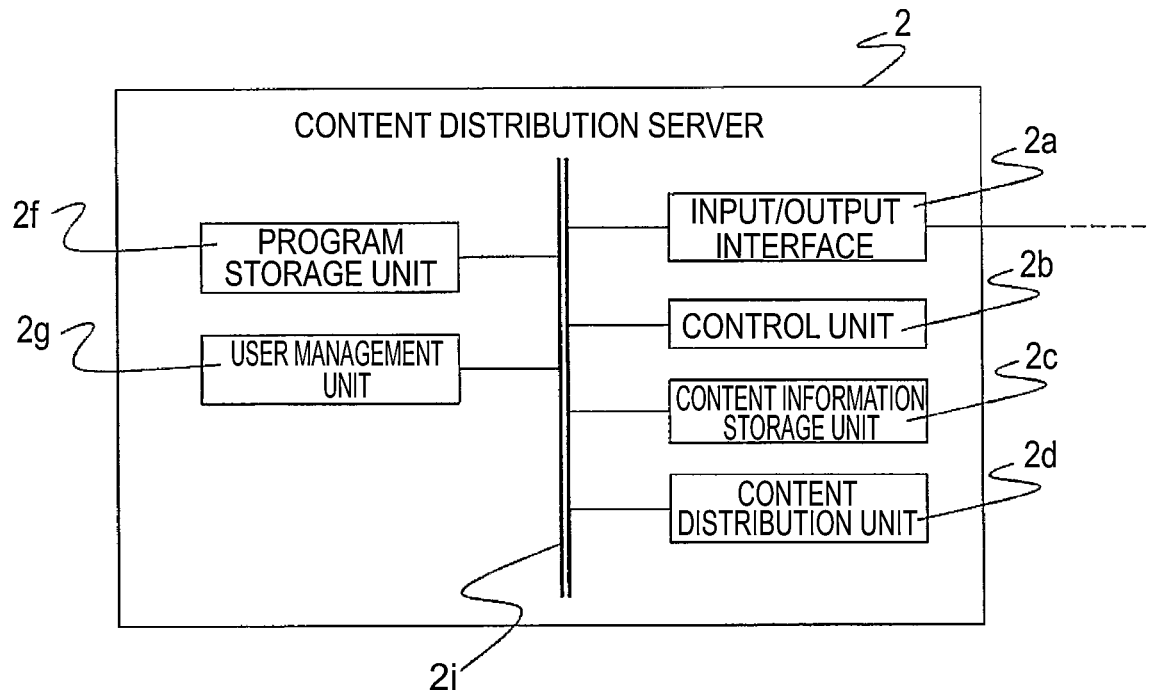
FIG. 2 is a block diagram of a content distribution server of the content distribution receiving system of FIG. 1.

As illustrated in FIG. 2, the content distribution server 2 includes an input/output interface 2a that is a data transmission terminal inside and outside the server, and a control unit 2b including a central processing unit (CPU) that controls the operation of each configuration of the server 2.

Similarly, a content information storage unit 2c of the server 2 retains information of a content (a broadcasting program) initially subjected to the internet live broadcasting, information of a specification of a virtual object that is information such as a specification or a movement (a motion) including the appearance with respect to the background of the virtual space or the virtual object, a virtual camera (including information of the position and the direction of a viewpoint and movable in the virtual space), and an avatar (a virtual substitution) capable of moving around the virtual space, and motion information of the virtual object, for a period from the start to the end of the content. A characteristic point of this system 1 is that the data of the content is not retained as rendered data (drawn data, so-called moving image data that is displayed on a display screen as it is), but is retained as the specification data of the virtual object that is a virtual target (the appearance, a voice character, sound effect data, music data, and the like), and the motion data of the virtual object (operation data, data of a direction to which the virtual object is directed, data of a position coordinate, and the like) as well. Then, when the content is reproduced by the viewer terminal or the like, as with the configuration of the related art, the drawn data that has been rendered is not simply displayed on the screen, but the drawn data is generated by performing rendering from the specification data of the virtual object and the motion data of the virtual data "at the time of the reproduction". As described above, "generating the drawn data by performing the rendering from the specification data of the virtual object and the motion data of the virtual data" is actually the same as an operation when the content is subjected to the live broadcasting through the internet or the like. That is, by using the configuration of this system 1, it is possible to reproduce the content with approximately the same operation, configuration, and quality as those when the content is subjected to the live broadcasting, which is a major difference from the configuration of the technology of the related art. Further, such data is corrected, added, and modified at the time of the reproduction by utilizing "generating the drawn data by performing the rendering from the specification data of the virtual object and the motion data of the virtual data" at the time of the reproduction, and thus, a corrected version of the content is easily generated.

A content storage unit of the server 2 stores a content of a new version in which the original live broadcasting is modified as described above, and transmits the content, in accordance with a reproduction request from each of the subsequent viewer terminals. As a storage method, in a case where the content of a new version is generated, an old version may be discarded and only a new version may be stored, or an old version may be kept and the content of a new version may be stored.

A content distribution unit 2d transmits each content that is stored in the content information storage unit 2c to each terminal that has requested viewing to be provided to the viewing. A program storage unit 2f stores a program for attaining each execution operation of the server 2.

A user management unit 2g retains information such as the distributor terminal that is used by the distributor staging each live content described above, viewing the content by viewing the live content, and the viewer terminal that is used by the viewer performing modification or addition as data such as an internet protocol (IP) address, and account information of a moving image distribution service, and thus, which terminal a certain live content is transmitted and supplied to and which terminal modifies or adds which live content is stored as data, by using the information stored in the user management unit 2g. Therefore, system diagram information of the live content, such as how the live content initially subjected to the internet live broadcasting is modified or added, is also retained.

A bus line 2i connects the configurations of the server 2 to each other such that data exchange can be performed.

The first distributor terminal 11 and the second distributor terminal 21 have a common configuration, and hereinafter, the first distributor terminal 11 will be described as an example.

[Configuration of First Distributor Terminal 11]

Figure 3:
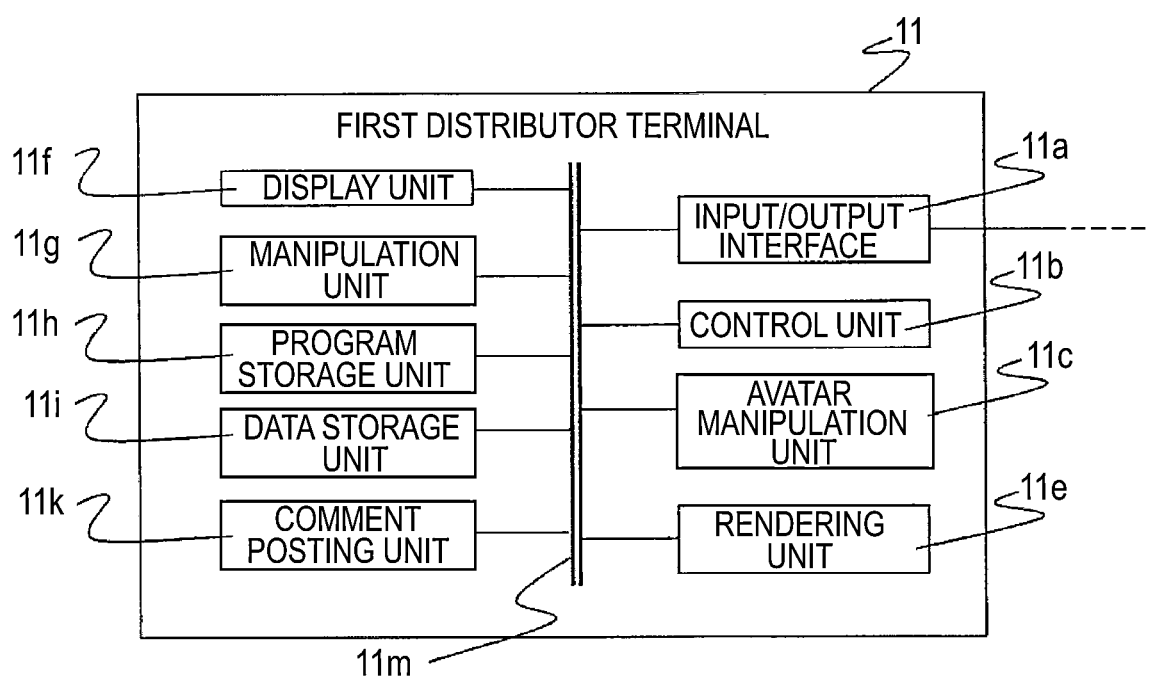
FIG. 3 is a block diagram of a first distributor terminal of the content distribution receiving system of FIG. 1.

As illustrated in FIG. 3, first, the first distributor terminal 11 includes an input/output interface 11a that is an information input/output terminal inside and outside the terminal, and a control unit 11b including a central processing unit (CPU) that controls each configuration of the terminal 11.

Figure 7:
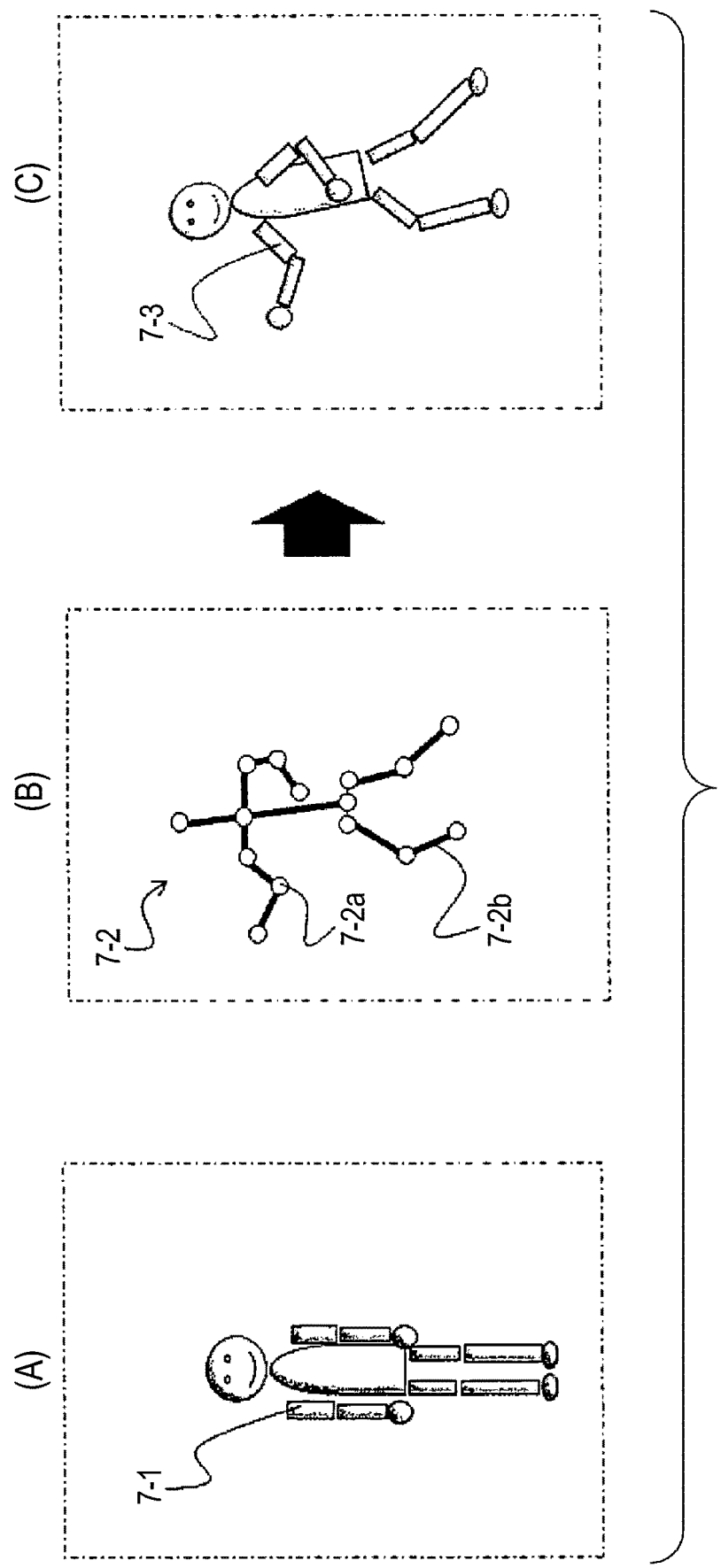
FIG. 7 is a schematic view illustrating data relevant to an avatar that is used by the content distribution receiving system of the invention.

In order for the distributor to allow an avatar that is the own virtual alter ego to appear in the virtual space and to perform a desired operation, an avatar manipulation unit 11c first stores appearance data of the avatar, voice character data of the avatar, sound effect data of the avatar, music data of the avatar, and the like, in a data storage unit 11i of the first distributor terminal 11, as the specification data of the avatar, which is one of the specification data items of the virtual object, described above, and the avatar manipulation unit 11c acquires the motion data by using data obtained by photographing the own movement with an acceleration sensor or a 3D camera mounted on the body of the distributor or the like who is a manipulator, or data obtained by sensing the movement of each part of the own body with a Doppler sensor, and transmits the motion data to the server 2 as motion data of the avatar, which is one of the motion data items of the virtual object, described above, or stores the motion data in the data storage unit 11i. Specifically, as illustrated in FIG. 7, the avatar manipulation unit 11c determines whether to prepare specification data including appearance data 7-1 of the avatar, which is one of the specification data items of the virtual object or to select specification data that is prepared and provided by the system, by designating a uniform resource locator (URL) of the appearance data or the specification data disposed on a network. Then, as motion data 7-2 that is a result of sensing the movement of each part of the own body of the distributor, as illustrated in FIG. 7(B), position information and movement information are obtained by using each part of the body as a joint 7-2a. Information of a ramus 7-2b connecting the joints 7-2a may be further generated to clarify a relationship between the joints 7-2a. Note that, for example, in a case where an avatar having an appearance of a young woman is manipulated by a man, the specification data of the avatar, which is one of the specification data items of the virtual object, is voice frequency characteristic data (voice character data) for changing the voice of the man to the voice of the young woman, a specific sound effect in a case where the avatar is moved, data of music that is characteristically played in the background in a case where the avatar appears, and the like, and may include other data items. Similarly, in the virtual object other than the avatar (also referred to as a virtual item or the like), not only the appearance data but also the voice character data may be added as the specification data in a case where an item is generated, and similarly, the sound effect data or the music data may be added as the specification data, in each of the virtual objects. The above respects are common to various virtual objects including the avatar that is used in this system 1, and hereinafter, the description may be omitted. Note that, the data items of the virtual object that is used by this system 1 are collectively shown in Table 1.

[Math. 1]

TABLE 1

Associated Data of Virtual Object

| Name of data | Specific Contents of Data |
| --- | --- |
| Specification data of virtual object | Virtual object (avatar and others), appearance, voice character, sound effect, music, and others |
| Motion data of virtual object | Movement, direction, position coordinate, and others of virtual object (avatar and others) |

A rendering unit 11e renders (draws) the virtual object by using the specification data of the virtual object and the motion data of the virtual object, which are transmitted from the outside of the terminal 11 or are stored in the terminal 11, and is used at the time of the reproduction of the content recorded in the past, and in the monitoring in which data relevant to the virtual object of the live content during the distribution from the current terminal 11 is received from the server 2, and the contents of the content is checked in real time. For this reason, the rendering unit 11e performs drawing (rendering) for visualizing the virtual space, by using the specification data of the avatar including the appearance data 7-1 of the avatar and the motion data 7-2, as described below, the specification data and the motion data of the virtual object thrown in a three-dimensional virtual space, a background image of the three-dimensional virtual space, or the specification data and the motion data of the virtual object disposed in the virtual space, and displays the obtained image of the virtual space including the virtual object on a display unit 11f of the first distributor terminal 11. As described above, for example, as illustrated in FIG. 7(C), in the rendering with respect to the avatar, the position or the movement of each part is obtained from the motion data 7-2, with respect to the appearance data 7-1 of the avatar that is one of the specification data items of the virtual object, and rendering data 7-3 of the avatar indicating the current position or the current movement of the avatar is generated. Note that, the rendering can be performed by using the appearance data 7-1 of the avatar that is still image data, and the data of the joint 7-2a or the ramus 7-2b configuring the motion data 7-2 of the avatar, but not video data, and thus, the appearance data 7-1 is the still image data and has small data capacity, the data of the joint 7-2a or the ramus 7-2b is coordinate data or motion vector data of the limited number of points but not the image data and has small capacity, and as a result thereof, it is possible to extremely decrease a load on a transmission path or hardware necessary for the transmission, the reception, the storage, or the rendering of the data. Further, insofar as the appearance data 7-1 of the avatar or the specification data is designated as a data storage destination by a uniform resource locator (URL) but not raw data (specific raw data), it is possible to perform the transmission or the storage with smaller letter string data. Advantages thereof are to obtain the same effect regardless of which configuration of the system the appearance data, the specification data, or the motion data is generated, transmitted, stored, and rendered with, and are the common effect at the time of rendering the virtual object not limited to a human avatar. Note that, in the attached drawings, a schematic view of the avatar illustrated in each part is simply displayed, and the movement of four extremities are not written, but such illustration indicates the rendering data 7-3 of the avatar as illustrated in FIG. 7(C). Note that, in a case of displaying the avatar by including not only the appearance but also the voice (herein, "display" is used as the meaning including not only the display of the image but also the display of the voice, the sound effect, or the like using a speaker, an oscillator, and the like), information of the voice from the avatar and character information of the voice may be included in the target of the data to be transmitted and received or stored by the system 1. For example, as described above, in a case where the avatar has the appearance and the character of a young woman, and a distributor manipulating the avatar is a man, the original voice production of the man is first stored, the stored voice of the man is changed and is used in the display of the avatar as the voice production of the young woman. It is effective that character information of the voice production used in the voice change (a frequency spectrum or the like of the voice production of a young woman character) is included in the appearance information of the avatar or the other information, along with voice production information of a person manipulating the avatar, such as the distributor. Similarly, when the virtual object is added to the live content, the sound effect (a blast sound, a collision sound, a flying sound, an onomatopoeia, and the like) or the music may be added, and the sound effect data and the music data may be the data of the target to be transmitted and received or stored by the system 1. Such data is also added to the specification data of the avatar or the other data. Note that, in the specification data, data relevant to oscillation may be included, and in this case, for example, a controller manipulating the avatar (a manipulation tool with a button or the like) may be oscillated, and the same applies to each part of the system 1 and each aspect.

The display unit 11f performs screen display in order for the distributor to view the live content, in order for the current distributor to monitor a rendering image to check the contents of the live content during the distribution, or in order to perform various manipulations, and is attained by a display panel of a personal computer, a goggle-type head mount display (HMD) mounted on the face, and the like. A manipulation unit 11g is used by the distributor to manipulate various operations, and for example, may be a keyboard of a personal computer, a mouse, and a touch panel, or may be a device that is manipulated by the motion data of the manipulator. A program storage unit 11h may store a computer program necessary for the distribution or the viewing of the live content, and may include a general-purpose computer operating system (OS), an internet browsing program (a browser), and the like. The data storage unit 11i stores background data of the virtual space used in the live content, the specification data and the motion data of the virtual data, and the like.

A comment posting unit 11k has a configuration for posting a comment that is letter information displayed as an independent virtual object as with an object in the shape of a large letter, such as performing display over the display screen of the live content or performing display on the surface of the virtual object in the virtual space 30, to the server 2. A bus line 11m connects the configurations of the distributor terminal 11 to each other such that data exchange can be performed.

The first viewer terminal 12 and the second viewer terminal 22 have a common configuration, and hereinafter, the first viewer terminal 12 will be described as an example.

[Configuration of First Viewer Terminal 12]

Figure 4:
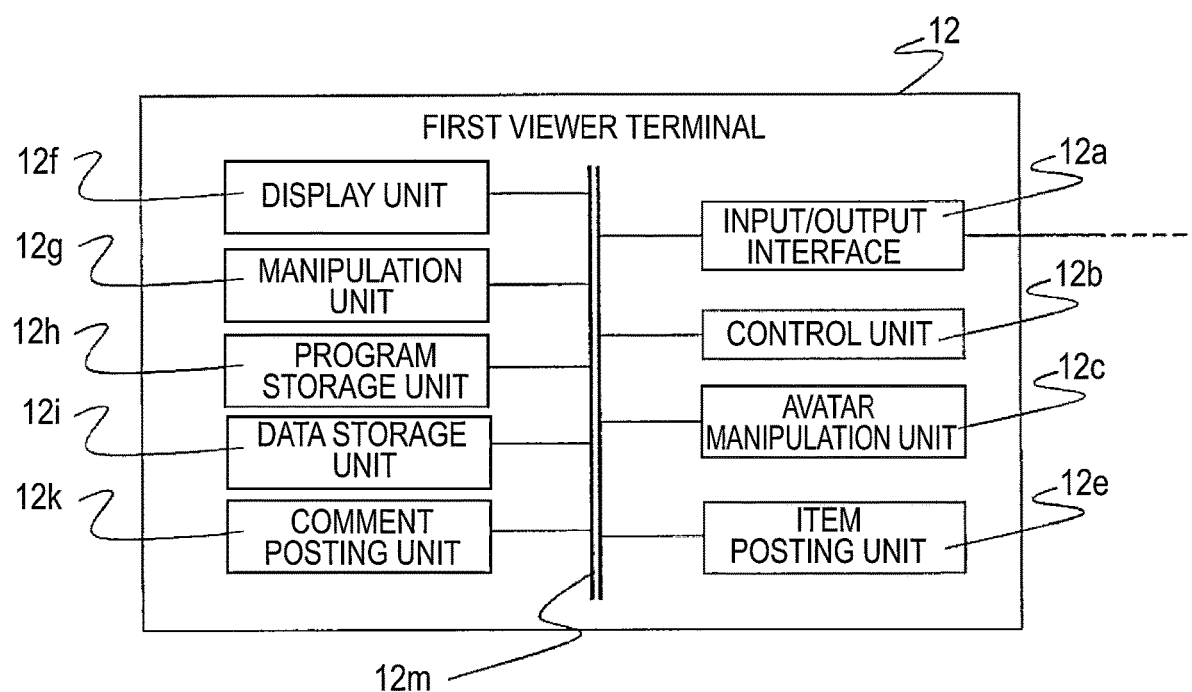
FIG. 4 is a block diagram of a first viewer terminal of the content distribution receiving system of FIG. 1.

As illustrated in FIG. 4, the first viewer terminal 12 includes an input/output interface 12a that is a data transmission and reception terminal inside and outside the terminal 12, and a control unit 12b including a central processing unit (CPU) that controls each part of the terminal 12.

An avatar manipulation unit 12c first stores the appearance data of the avatar, the voice character data of the avatar, the sound effect data of the avatar, the music data of the avatar, and the like, in a data storage unit 12i, as the specification data of the avatar that is one of the specification data items of the virtual object, described above, and in order for the viewer or the like who is the manipulator to allow the avatar that is the own virtual alter ego to appear in the virtual space to perform a desired operation, the avatar manipulation unit 12c acquires the motion data by using the data obtained by photographing the own movement with an acceleration sensor or a 3D camera mounted on the body of the distributor, or the data obtained by sensing the movement of each part of the own body with a Doppler sensor, and transmits the motion data to the server 2 as image information as it is or rendered. As described above, with reference to FIG. 7, the avatar manipulation unit 12c determines whether to prepare the specification data of the avatar including the appearance data 7-1 of the avatar, which is one of the specification data items of the virtual data, or to select the specification data that is prepared and provided by the system, by designating a uniform resource locator (URL) the appearance data or the specification data disposed on a network. Then, as the motion data 7-2 that is a result of sensing the movement of each part of the body, as illustrated in FIG. 7(B), the position information and the movement information are obtained by using each part of the body as the joint 7-2a. The information of the ramus 7-2b connecting the joints 7-2a may be further generated to clarify the relationship between the joints 7-2a. Note that, in a case of displaying the avatar by including not only the appearance but also the voice (herein, "display" is used as the meaning including not only the display of the image but also the display of the voice, the sound effect, or the like using a speaker, an oscillator, and the like), the information of the voice from the avatar and the character information of the voice may be included in the target of the data to be transmitted and received or stored by the system 1, as the specification data of the avatar by including the appearance data of the avatar. For example, in a case where the avatar has the appearance and the character of a young woman, and a distributor manipulating the avatar is a man, the original voice production of the man is first stored, the stored voice of the man is changed and is used in the display of the avatar as the voice production of the young woman. It is effective that the character information of the voice production used in the voice change (the frequency spectrum or the like of the voice production of the young woman character) is included in the specification information of the avatar combined with the appearance information of the avatar, along with the voice production information of a person manipulating the avatar, such as the viewer. Similarly, when the virtual object is added to the live content, the sound effect (the blast sound, the collision sound, the flying sound, the onomatopoeia, and the like) or the music may be added, the sound effect data and the music data may be the data of the target to be transmitted and received or stored by the system 1. Such data is also added to the specification data of the avatar, along with the appearance information or the other data.

In order for the viewer to allow the own avatar to appear in the live content that the view is viewing, an item posting unit 12e is used for posting the specification data of the virtual object, including the appearance data of the avatar, and the motion data of the virtual object, described above, to the server 2, or for posting a new virtual object to the live content that the viewer is reproducing and viewing.

A display unit 12f has a configuration for performing screen display in order for the viewer to view the live content or to perform various manipulations, and is attained by a display panel of a personal computer, a goggle-type head mount display (HMD) mounted on the face, and the like.

A manipulation unit 12g is used by the viewer to manipulate various operations, and may be a keyboard of a personal computer, a mouse, and a touch panel, or may be a device that is manipulated by the motion data of the manipulator. A program storage unit 12h may store a computer program necessary for the viewing of the live content, and may include a general-purpose computer operating system (OS), an internet browsing program (a browser), and the like. The data storage unit 12i stores the data described above and various other data items.

A comment posting unit 12k has a configuration for posting a comment that is letter information displayed as an independent virtual object as with a virtual object in the shape of a huge letter, such as performing display over the display screen of the live content or performing display on the surface of the virtual object in the virtual space 30, to the server 2. A bus line 12m connects the configurations of the viewer terminal 12 to each other such that data exchange can be performed.

Figure 5:
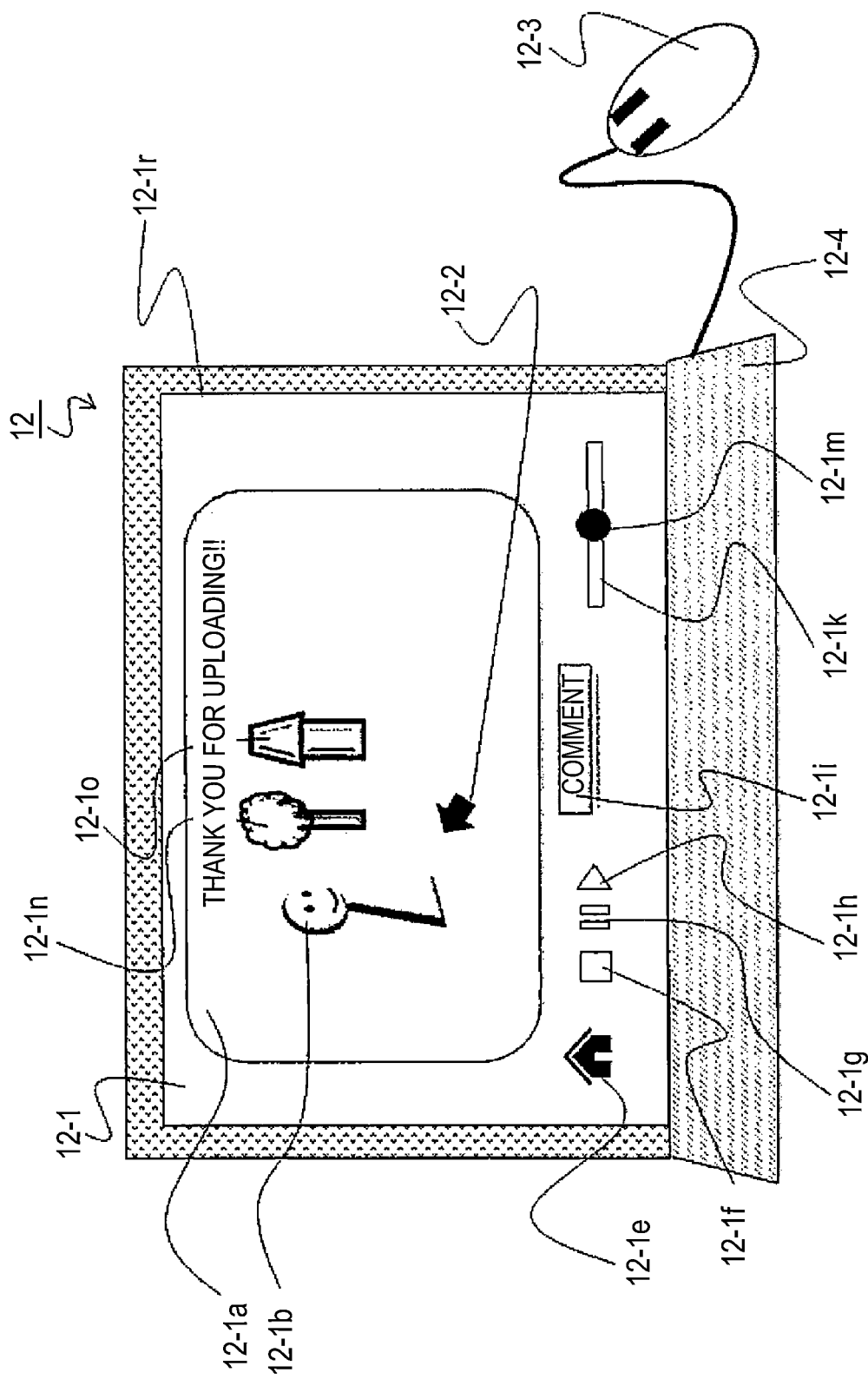
FIG. 5 is a schematic external view of the first viewer terminal of FIG. 4.

FIG. 5 schematically illustrates an appearance in a case of attaining the first viewer terminal 12 by a personal computer, and in a case where the viewer performs connection with respect to the server 2 by inputting a uniform resource locator (URL) known in advance, in order to use the service of the this system 1, necessary data and a JavaScript (Registered Trademark) program are sent from the server 2, and a portal screen (not illustrated) of a video distribution service is displayed on a display panel 12-1 displaying various images, a still image, a moving image, or letter information.

The viewer selects in advance a live content that the viewer wants to view as the internet live broadcasting or as the reproduction content from a display list (not illustrated), and FIG. 5 illustrates a situation assuming that the live content is displayed.

In FIG. 5, the display panel 12-1 includes a video display area 12-1a for displaying the live content video, and in the video display area 12-1a, an avatar 12-1b of a first distributor who is a distributor of the live content, and a tree 12-1n and a house 12-10 that are a virtual object disposed in a virtual space in which the live content is used are further displayed. In addition, a comment 12-1r is further displayed in the display panel 12-1, the comment 12-1r of "Thank you for uploading!!" appears from the right end of the display panel 12-1, is moved to the left end by scroll movement, and disappears. A range in which the comment 12-1r is displayed is larger than the video display area 12-1a for displaying the live content video and is set to extend over the video display area 12-1a, and thus, the viewer is capable of clearly understanding that the comment 12-r is not the original contents of a content, but is posted from another poster.

Similarly, a home button display 12-1e for returning to a portal page (not illustrated) of the video distribution service, a stop button display 12-1f used in a case where the content that is being viewed is not the live broadcasting but the reproduction content, a pause button display 12-1g, and a reproduction button display 12-1h are respectively displayed on the display panel 12-1.

A comment posting button display 12-1i in the display panel 12-1 is a button for posting the comment described above with respect to the content that the viewer is viewing.

In a case where the content is the reproduction content, in a seek bar display 12-1k, the position of a seek button display 12-1m indicates the current reproduction time by allowing a reproduction start time to correspond to the left end and a reproduction end time to correspond to the right end, and it is possible to move the position of the seek button display 12-1m to a time that the viewer wants to perform the reproduction, with a mouse pointer 12-3. As the manipulation unit 12g described above, there are the mouse pointer 12-3 and a mouse cursor 12-2, and a keyboard 12-4 is also provided in the viewer terminal 12.

[Content Viewing During Live Broadcasting]

Figure 6:
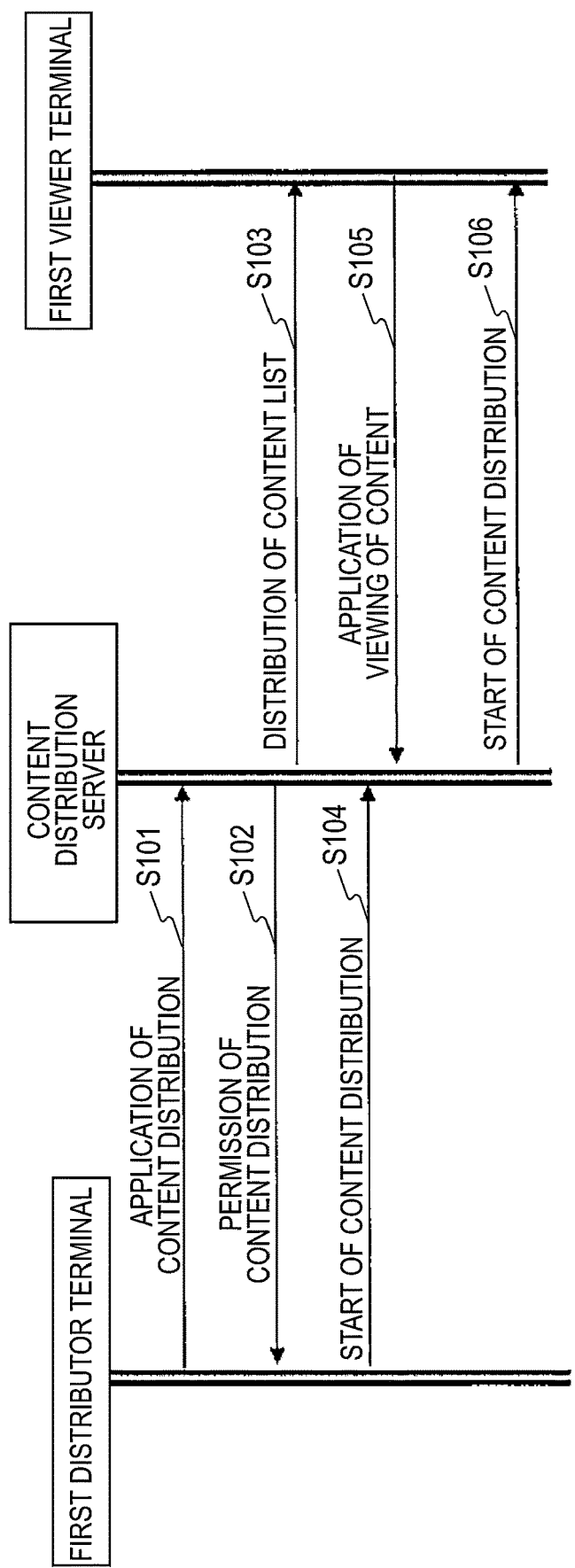
FIG. 6 is a signal flowchart of content viewing during live broadcasting, which is executed by the content distribution receiving system of the invention.

Next, an operation until the live content that is internet live broadcasting that is posted and distributed from the first distributor terminal 11 is viewed by the first viewer terminal 12 will be described by using a signal flow graph of FIG. 6, a first virtual space schematic view of FIG. 8, and a rendering result seen from each viewpoint of FIG. 9, respectively.

A distributor who plans to stage and distribute a live content applies content distribution to the server 2 by using the first distributor terminal 11 (step S101). In a case where the server 2 permits the distribution, the permission is notified to the first distributor terminal 11 from the server 2 (step S102), and the server 2 displays the live content as a content that can be viewed on a suitable page of a distribution service site, as a list, or distributes the list to a logged-in viewer terminal (step S103).

Figure 8:
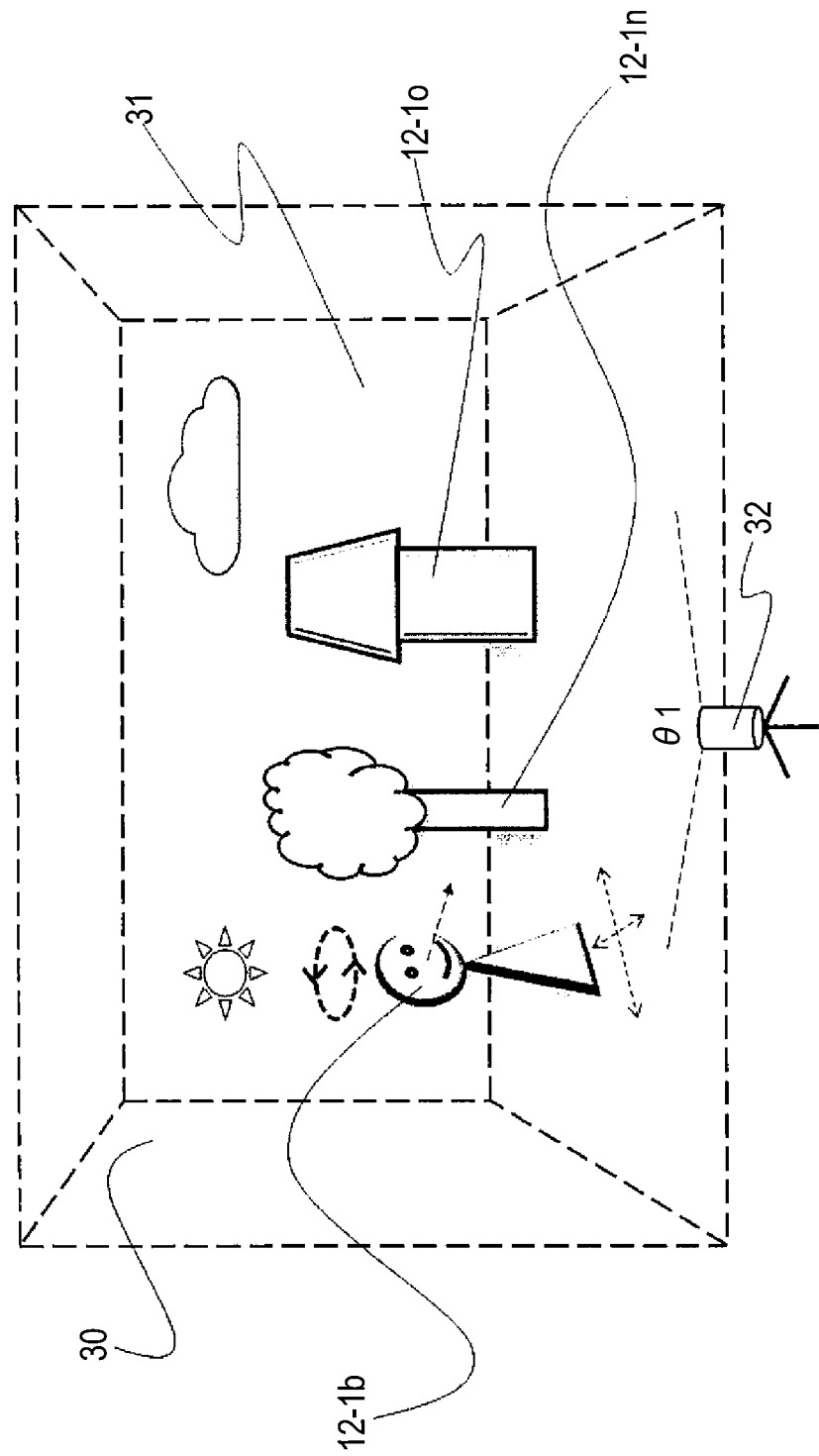
FIG. 8 is a schematic view of a virtual space during live broadcasting, in the content distribution receiving system of the invention.
Figure 9:
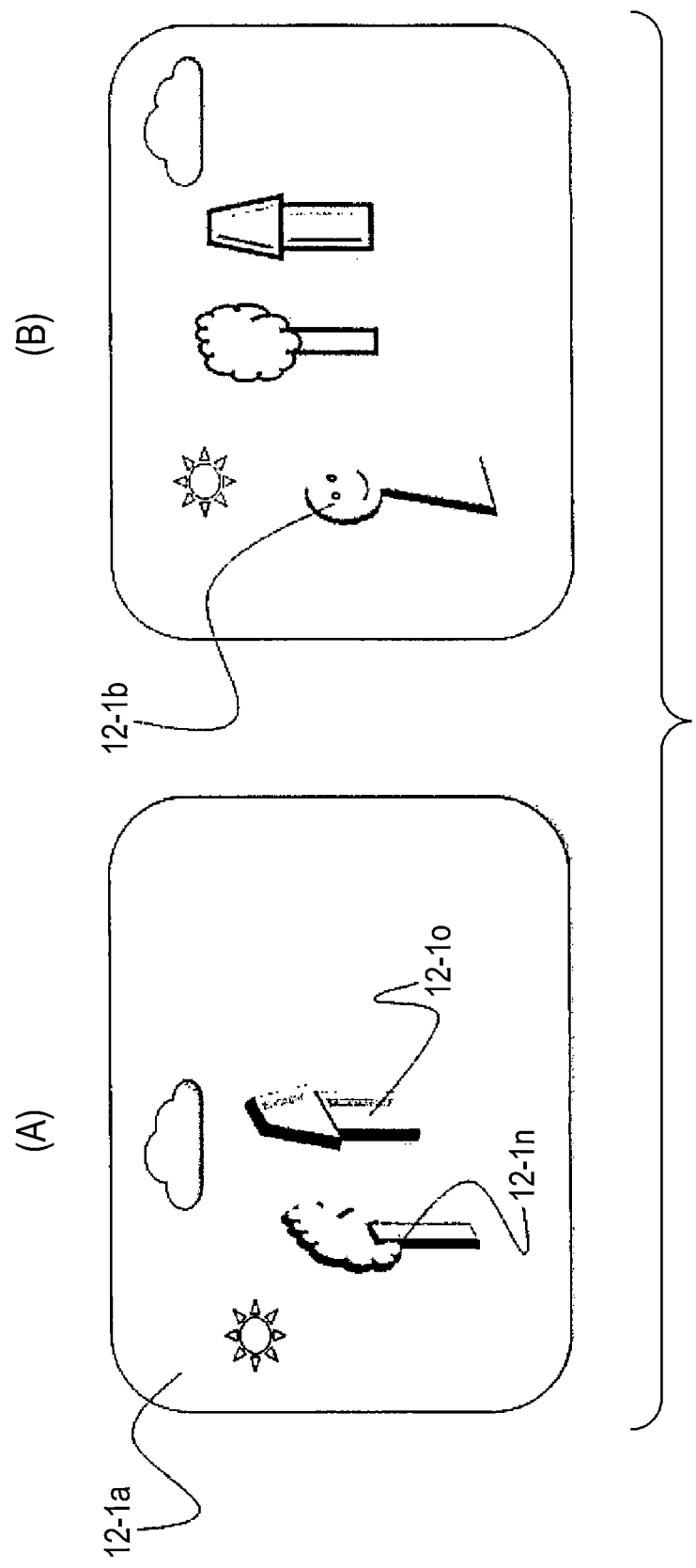
FIG. 9 is a schematic view of rendering seen from each viewpoint, in the virtual space illustrated in FIG. 8.

The distribution is permitted, and thus, the first distributor terminal 11 transmits the avatar display 12-1b of the first distributor that is each virtual object in the virtual space 30 illustrated in FIG. 8, and specification data and motion data relevant to another virtual object to the server 2, as a live content for internet live broadcasting (S104), and stores the specification data and the motion data relevant to the virtual object in the server 2.

As described above, the distributor controls the operation of the avatar 12-1b by generating the motion data, and thus, in the virtual space 30, the avatar 12-1b is capable of performing an operation such as a movement, a change in the direction, and a change in the posture. Similarly, as described above by using "Table 1 Associated Data of Virtual Object", in a case of performing display including not only the appearance of the virtual object including the avatar but also the voice (herein, "display" is used as the meaning including not only the display of the image but also the display of the voice, the sound effect, or the like using a speaker, an oscillator, and the like), the information of the voice from the virtual object including the avatar and the character information of the voice may be included in the target of the data to be transmitted and received or stored in the system 1, as the specification information of the virtual object.

A virtual camera 32 disposed in the virtual space 30 is not necessarily disposed in the center as illustrated, but the installation location thereof may be arbitrary, the virtual camera may be moved, or a plurality of virtual cameras may be installed. In addition, the viewer performing the reproduction may add or move the virtual cameras in the middle of the live content, as a part of a modification operation or an addition operation of the live content. The operation of the virtual cameras is common to other parts of the present specification, and in order to avoid complication in the following description, only one virtual camera is exemplified in each virtual space.

According to the list, a viewer who knows the existence of the live content during the broadcasting applies the viewing of the live content that is internet live broadcasting to the server 2 from the first viewer terminal 12 (step S105), and as a result thereof, transmits the specification data and the motion data of the virtual object in the virtual space 30, including the motion data 7-2 of the avatar 12-1b of the first distributor or the appearance data 7-1 of the avatar to the first viewer terminal 12 from the server 2 (step S106), and performs rendering by the first viewer terminal 12. A rendering result is exemplified as FIG. 9(A) (an image seen from the viewpoint of a first distributor avatar) and FIG. 9(B) (an image seen from the viewpoint of a first virtual camera).

In addition, the live content distributed by the first distributor terminal 11 is not limited to the first viewer terminal 12, but other users using this video distribution system including the second viewer terminal 22 are also capable of performing application to view the live content.

[Reproduction of Content after Live Broadcasting]

Figure 10:
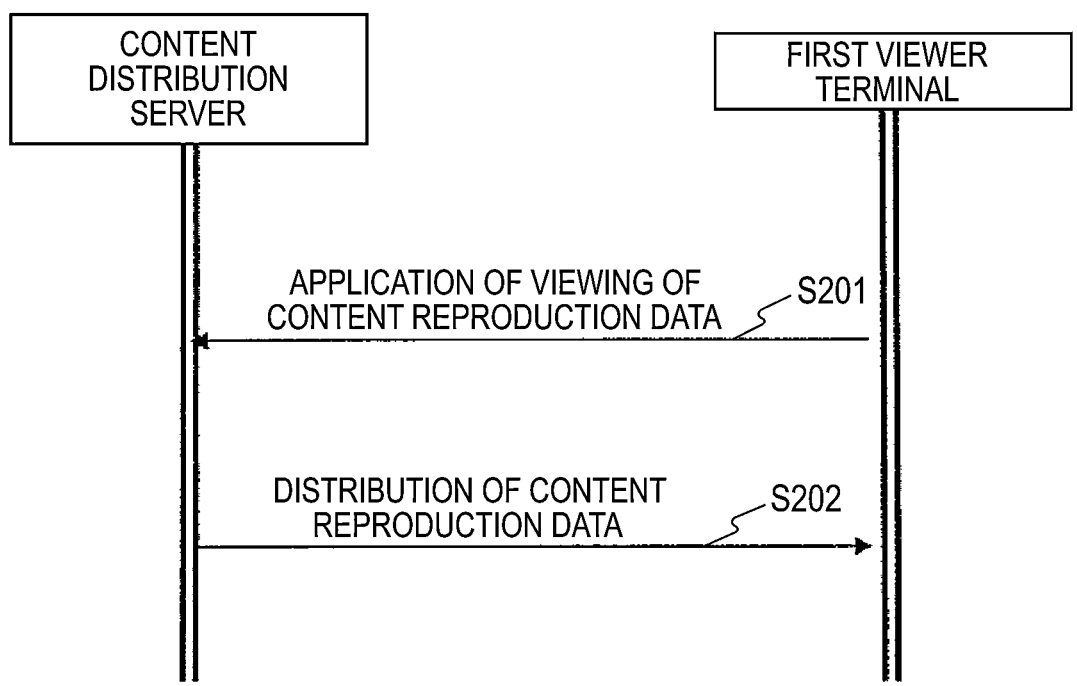
FIG. 10 is a signal flowchart relevant to content reproduction after live broadcasting, in the content distribution receiving system of the invention.
Figure 11:
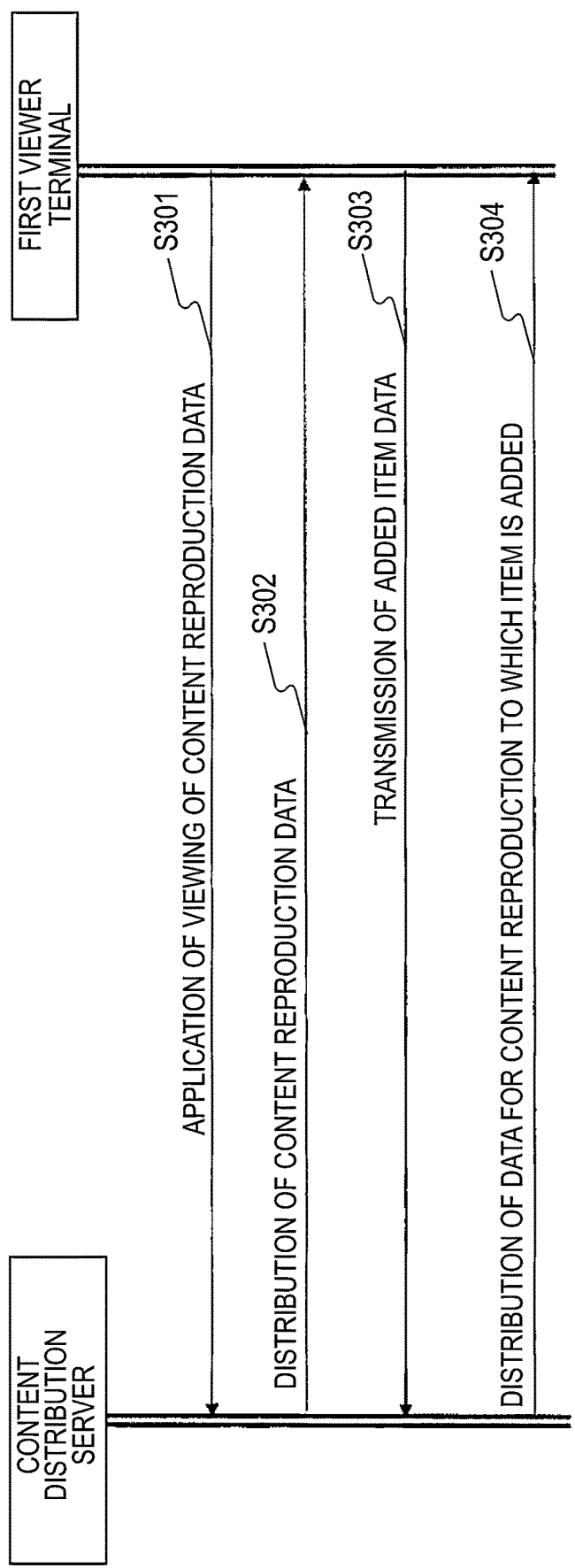
FIG. 11 is a signal flowchart of addition of a virtual item with respect to a reproduction content after live broadcasting, which is executed by the content distribution receiving system of the invention.

Next, as a result of performing the internet live broadcasting by the first distributor terminal 11, an operation of performing application to reproduce the live content stored in the server 2 as the specification data and the motion data of the virtual object, from the first viewer terminal 12, after the time of the live broadcasting, will be described with reference to FIG. 10.

First, a viewer who plans to reproduce the live content that has been stored in the server 2 selects a desired live content from a list representing all live contents prepared in advance by the server 2, and applies the reproduction to the server 2. In the server 2, the specification data and the motion data of the virtual object, which are the designated live content, are transmitted to the first viewer terminal 12, and thus, the viewer performs the rendering (the drawing) by using the first viewer terminal 12, the images illustrated in FIGS. 9(A) and 9(B) are displayed on the display panel 12-1 of the first viewer terminal 12, and as a result thereof, the viewer is capable of viewing the live content used in the virtual space. At this time, as illustrated in FIG. 9(A) and FIG. 9(B), the viewer is also capable of viewing the rendering image seen from the viewpoint of the avatar 12-1b of the first distributor and of viewing the rendering image seen from a first virtual camera 32, in accordance with a switching manipulation, and thus, unlike simply watching passively a television broadcasting screen or a movie screen, it is possible to watch the content while actively switching a plurality of different viewpoints with the own will. Here, the live content uses a three-dimensional (3D) virtual space, and thus, it is possible for the viewer to view the virtual space 30 by viewing a plurality of directions while performing a switching manipulation with respect to the viewpoint, and it is possible for the viewer to obtain a realistic sensation, a sense of immersion, and a sense of connectedness, which are not obtained in the viewing of a two-dimensional (2D) content. Such a realistic sensation or the like is imparted to the viewer, as a sense as if viewing the live content of the live broadcasting, regardless of viewing the reproduction content. In addition, in the description from another aspect, as described above, the characteristic point of this system 1 is that the data of the content is not retained as the rendered data (the drawn data, so-called moving image data that is displayed on the display screen as it is), but is retained as the specification data of the virtual object that is a virtual target (the appearance, the voice character, the sound effect data, the music data, and the like), and the motion data of the virtual object (the operation data, the data of the direction to which the virtual object is directed, the data of the position coordinate, and the like). Then, when the content is reproduced by the viewer terminal or the like, as with the configuration of the related art, the drawn data that has been rendered is not simply displayed on the screen, but the drawn data is generated by performing the rendering from the specification data of the virtual object and the motion data of the virtual data "at the time of the reproduction". As described above, "generating the drawn data by performing the rendering from the specification data of the virtual object and the motion data of the virtual data" is actually the same as the operation when the content is subjected to the live broadcasting through the internet or the like. That is, by using the configuration of this system 1, it is possible to reproduce the content with approximately the same operation, configuration, and quality as those when the content is subjected to the live broadcasting, which is a major difference from the configuration of the technology of the related art. Further, such data is corrected, added, and modified at the time of the reproduction by utilizing "generating the drawn data by performing the rendering from the specification data of the virtual object and the motion data of the virtual data" at the time of the reproduction, and thus, a corrected version of the content is easily generated, and such respects will be described below.

[Addition of Virtual Item with Respect to Reproduction Content after Live Broadcasting]

Next, an operation for the viewer using the first viewer terminal 12 to modify or add the live content to the own desired contents in a state in which the first viewer terminal 12 reproduces and views the live content that is subjected in advance to the internet live broadcasting by the first distributor terminal 11, described by using FIG. 6 to FIG. 9, will be described by using FIG. 11 to FIG. 14.

As with the procedure of reproducing the live content, described above, the application of live content reproduction is performed with respect to the server 2 from the first viewer terminal 12 (step S301).

The server 2 receiving the application transmits the live content that is a target to the first viewer terminal 12, as the specification data and the motion data of the virtual object, and provides the live content for the rendering and the viewing of the content, described above (step S302).

As described above, the viewer is capable of simply viewing the transmitted live content, and for example, in a case of a dance scene, the viewer itself may want to participate in the live content in the form of an avatar and to have a sense of connectedness by dancing with manipulators of each avatar that has already participated in the live content, or may want to input the own avatar into the live content and to view the live content from desired viewpoint that is decided by the viewer itself.

Therefore, the viewer performs application with respect to the server 2 in order to newly input the own avatar 12-1c to the live content while reproducing the live content, and transmits the specification data and the motion data of the virtual object, including the appearance information of the avatar that is necessary data, to the server 2, as added item data (step S303). Here, the avatar 12-1c of the viewer, as described above by using FIG. 7, is added as the data 7-3 that is rendered by using the specification data including the appearance data 7-1 of the avatar, the motion data 7-2 of the avatar, and the like, and the same applies to a case where the other virtual object is added from the viewer terminal 12, and thus, the other viewer who reproduces and views the live content later views the other virtual object to which the avatar 12-1c of the viewer is added in the desired movement and posture manipulated by the viewer, and thus, the viewer initially adding each virtual object by using the viewer terminal 12 is capable of obtaining a sense as if the viewer participates in the live content.

In response to this, the server 2 newly adds the avatar 12-1c of the viewer or the other virtual object into the virtual space 30, transmits the specification data and the motion data of all of the virtual objects in the content, including the added data to the first viewer terminal 12 (step S304), and adds the data of the avatar 12-1c and the other added virtual object even into the data of the live content stored in the server 2, and then, the other viewer terminal reproducing the live content views the live content including the avatar 12-1c of the viewer and the added virtual object. Note that, it is considerably effective that the added time information and the added information of the terminal or a user account with respect to the virtual object such as the newly added avatar are set to the data of the target to be transmitted and received or stored by the system 1. Such time information and the information of the terminal or the user may be stored in the server 2, and along with this or independently, may be written in the added specification information of the virtual object. As described above, setting the added time information, the added information of the terminal or the user account, and the like to the data of the target to be transmitted and received or stored by the system 1 is also effective in the other aspect of this system 1, and thus, hereinafter, the description thereof may be omitted.

Figure 12:
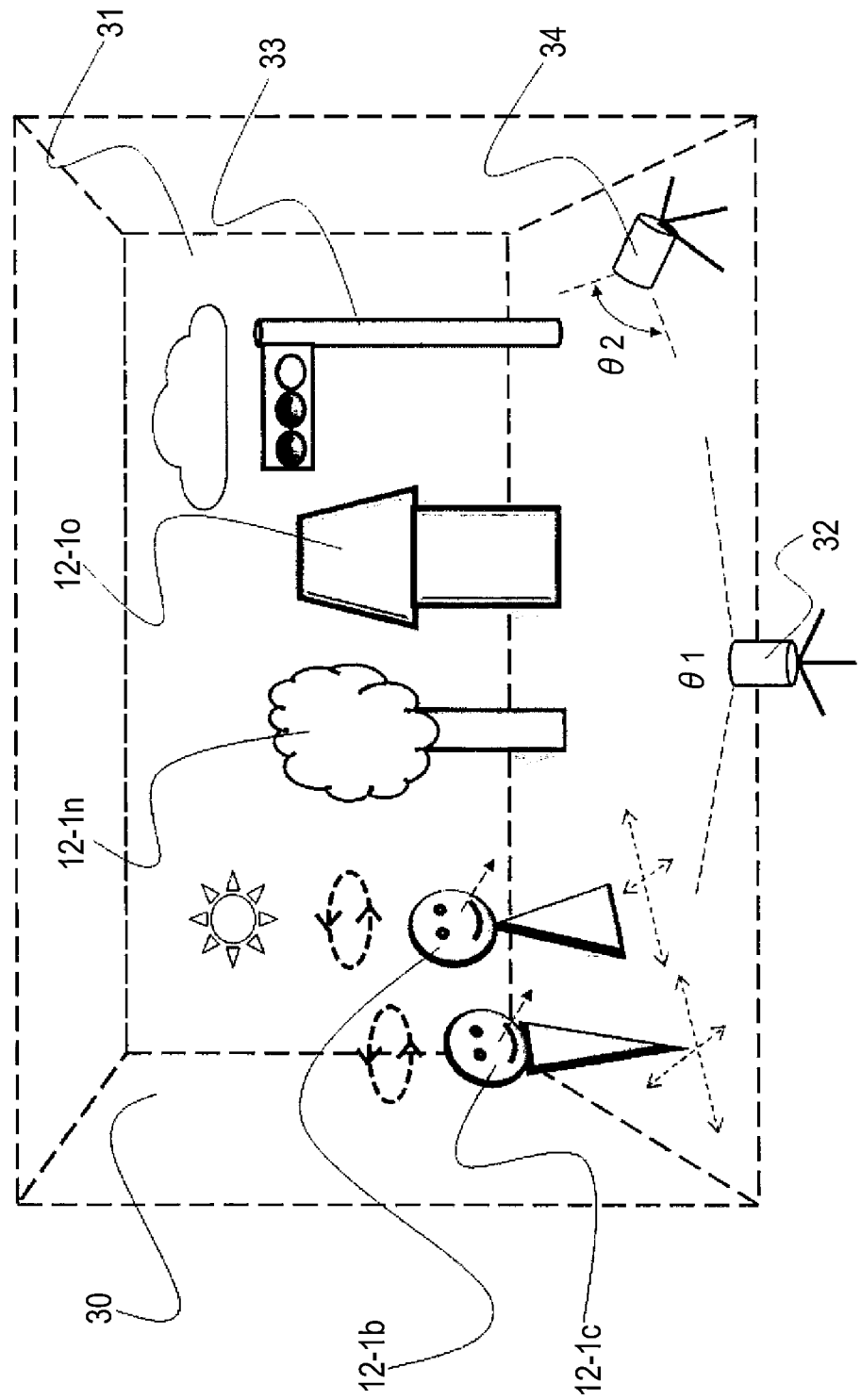
FIG. 12 is a schematic view of a virtual space to which a virtual object is added, in the content distribution receiving system of the invention.
Figure 13:
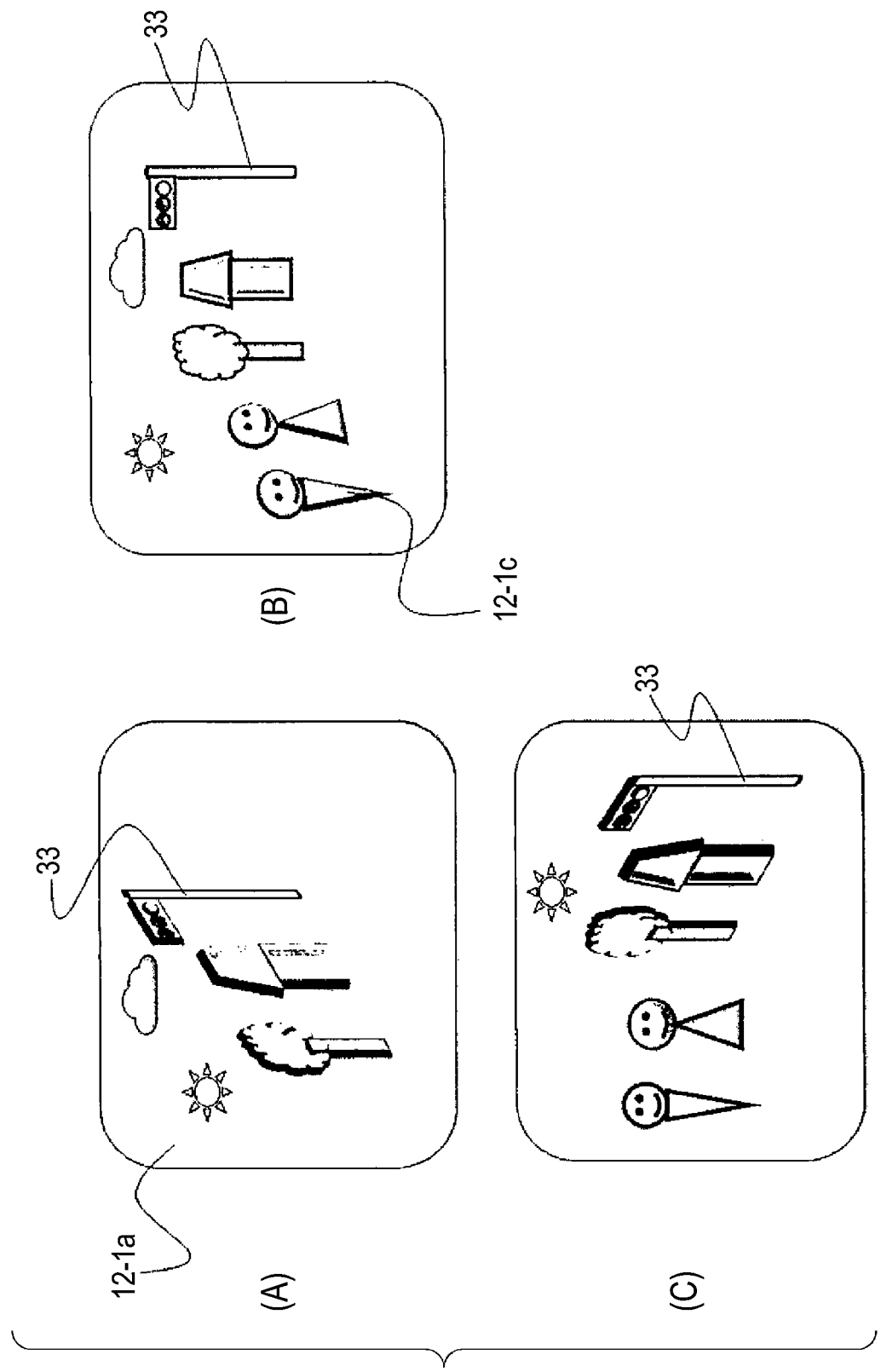
FIG. 13 is a schematic view of rendering seen from each viewpoint, in the virtual space illustrated in FIG. 12.

In FIG. 12 and FIG. 13, a state in which a virtual object such as a traffic light 33 and a second virtual camera 34 is newly added in addition to the avatar 12-1c of the first viewer is shown.

Note that, the modification of the live content may require the permission of an organizer of the original live content, and in a case of modifying the live content, both of data after being modified and data before being modified may be continuously stored in the server 2, and then, each of the viewers may be capable of reproducing any live content in accordance with a manipulation. According to such a configuration, the viewer may have a sense of satisfaction since the live content that is modified by the viewer itself can be reproduced by a plurality of other viewers, and a viewer who does not like such various modifications is also capable of viewing the content before being modified, and thus, it is possible to make issues such as the enhancement of a sense of connectedness and the appreciation of the own preference, which are difficult to be compatible originally.

In addition, it is possible for the viewer to particularly select and view the live content that is modified and is being watched or respected by the viewer itself, in addition to the organizer, the performer, or the like of the live content that the viewer is watching or respecting, and as described above, it is possible to prepare modified system data of the live content in the server 2, and thus, the viewer is capable of tracing the modified system of the live content that is preferable for the viewer itself and of enjoying finding the content of a version more suitable for the viewer itself.

[Adding Avatar to Reproduction Content after Live Broadcasting and Distributing Reproduction Content by Other Distributor]

In the above description, an example has been described in which the live content initially subjected to the internet live broadcasting is modified or added in accordance with the own preference of each of the viewers, but the live content to be reproduced (may be identical to the live broadcasting, or may be modified or added later) may be broadcast again by the same distributor or different distributors through the internet, and similarly, the live content may be modified or added from the viewer viewing the broadcasting.

Figure 14:
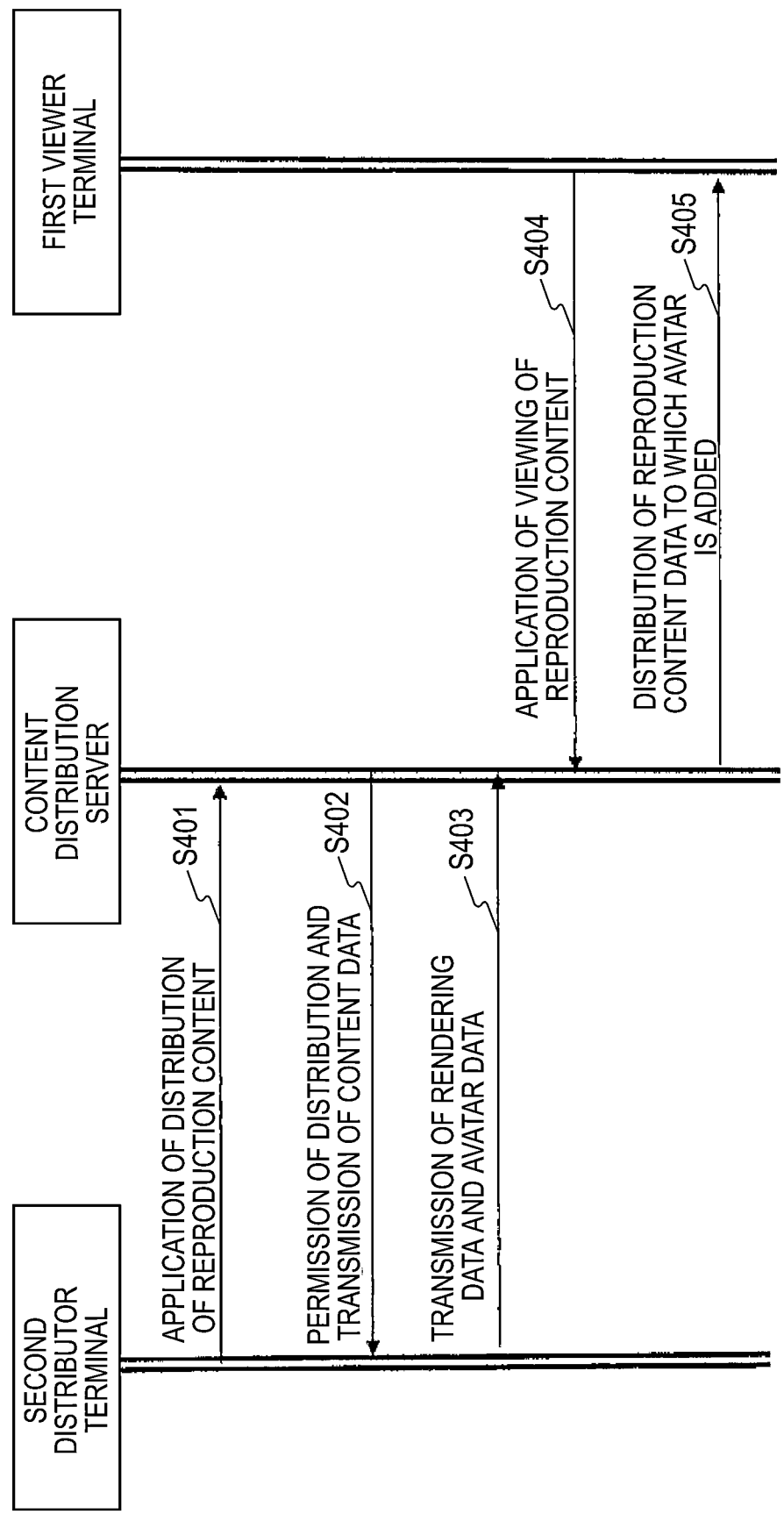
FIG. 14 is a signal flowchart of an operation executed by the content distribution receiving system of the invention, in which an avatar is added to a reproduction content after live broadcasting and is distributed by the other distributor.
Figure 15:
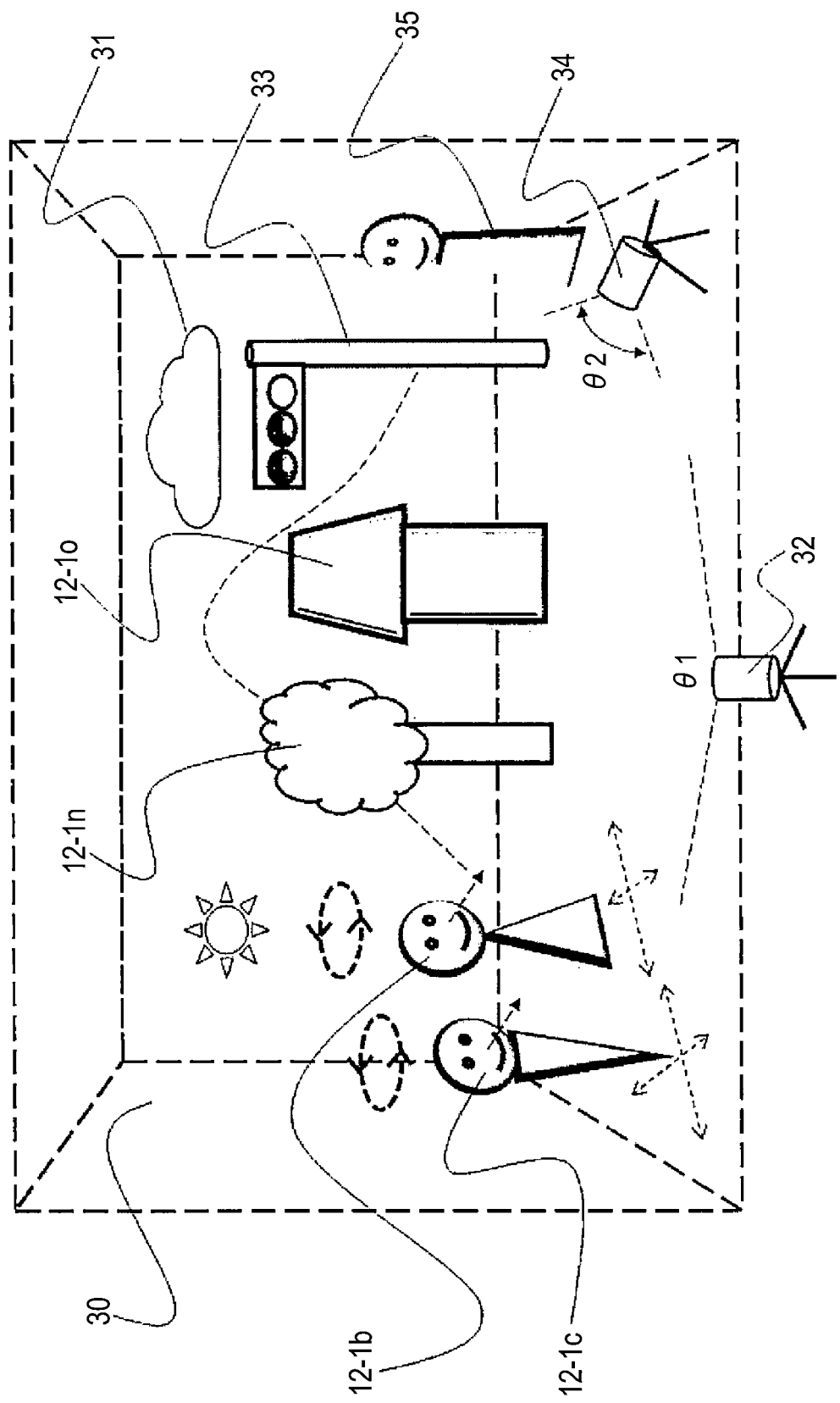
FIG. 15 is a schematic view of a virtual space in which an avatar is added to a reproduction content after live broadcasting and is distributed by the other distributor, in the content distribution receiving system of the invention.
Figure 16:
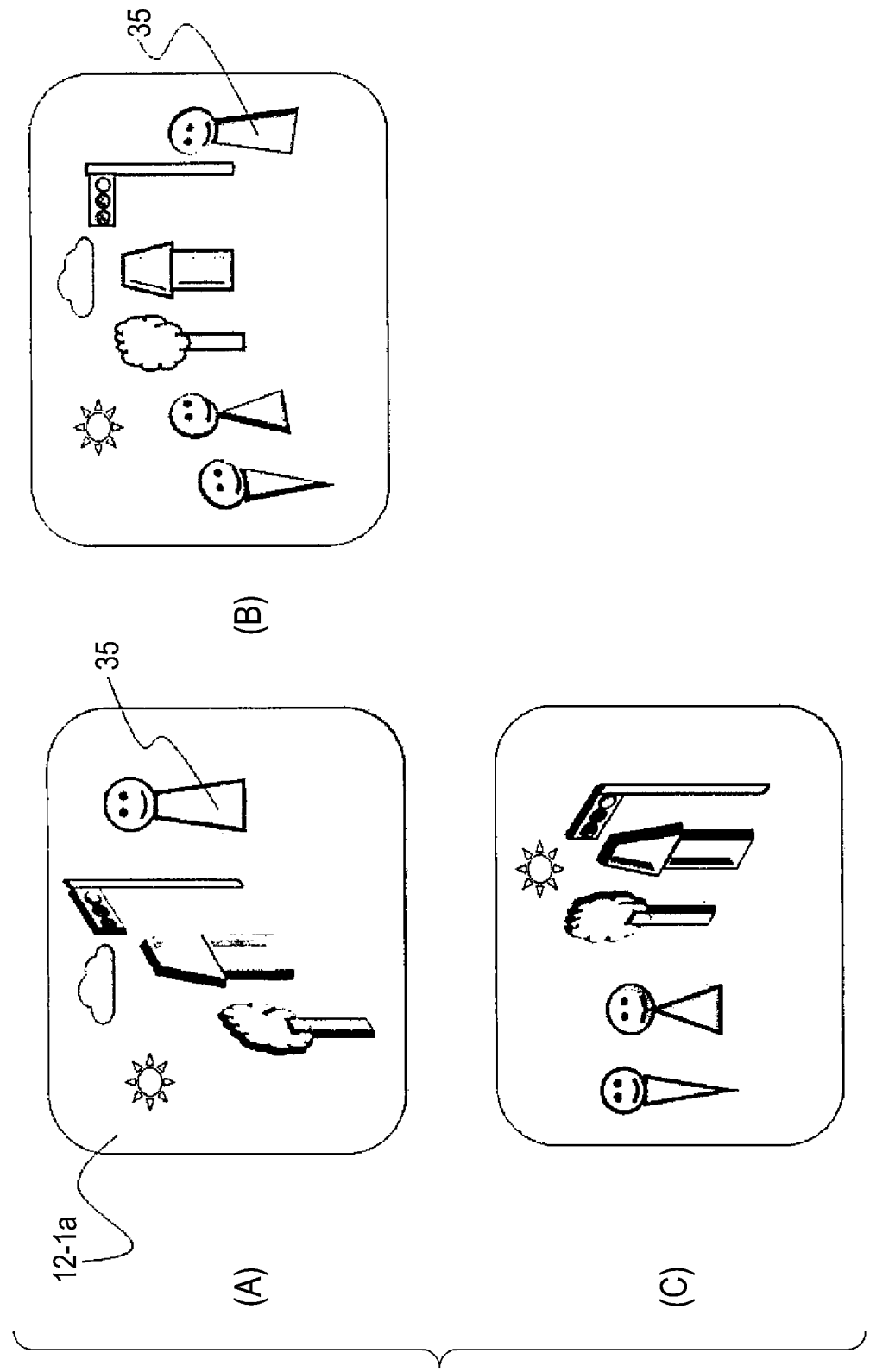
FIG. 16 is a schematic view of rendering seen from each viewpoint, in the virtual space illustrated in FIG. 15.

An example is illustrated in FIG. 14, FIG. 15, and FIG. 16, and in each of the drawings, an avatar 35 of a second distributor is added. The details of each operation are the same as described above.

Modification Example 1 to Arbitrary Properties of Disposition of Each Configuration In the above description of this embodiment, the rendering of each viewpoint image with respect to the virtual space subjected to the modification or addition by the viewer is performed by the viewer terminal that is used by the viewer. However, such a configuration is not essential for the implementation of the invention. That is, the rendering may be performed by the server or various other terminals. In order to perform the rendering as described above, it is sufficient that the specification data and the motion data of the virtual object are transmitted in advance to each of or both of the server and the terminal to be rendered, the detailed configuration or procedure is obvious from the configuration of this embodiment described above, and thus, the repeated description will be omitted.

Modification Example 2 to Throwing Virtual Object in Virtual Space

In the above description, a case of adding the avatars 12-1b and 12-1c that are the viewer itself and an example of adding the traffic light 33 have been described by using a case where the viewer reproducing the live content adds a new virtual object to the virtual space, in accordance with the own preference, as an example.

However, in the live performance and the theatrical performance in the real world, the performer can be even more excited by giving a celebration (also called "Ohineri") or flowers to the performer. In response to this, there is a proposal to newly display a virtual object corresponding to such a celebration in the content distribution in the virtual space, and to express the support and praise with respect to the performer.

In JP-A-2012-120098 that is the known patent document, it is disclosed that as a virtual item to be pasted onto the display screen of a live-action broadcasting program, for example, the viewer of the content purchases flowers, letters, logos, and the like, as a "decoration", and disposes the flowers, the letters, the logos, and the like in any position on the display screen to decorate the display screen.

In the system 1 of the embodiment of the invention, as a part of the invention, the viewer reproducing the live content using the virtual space throw the virtual object representing the support and praise with respect to the performer, and then, the other viewer reproducing the live content is capable of viewing the thrown virtual object, and as a result thereof, the support and praise of the viewer throwing the virtual object are widely recognized, and a viewer viewing the live content later is also capable of having the same sense of support or praise. Unlike throwing the virtual object with respect to the live content during the live broadcasting, throwing the virtual object with respect to the reproduction content is not real-time throwing (the support or praise), but it is possible to view the content as many times as needed insofar as the content is reproduced, and thus, the layer or the number of viewers increases, the reputation calls for reputation and more throwings can be performed and accumulated, and therefore, there is a merit for both the viewer side and the performer side to be presented.

Figure 17:
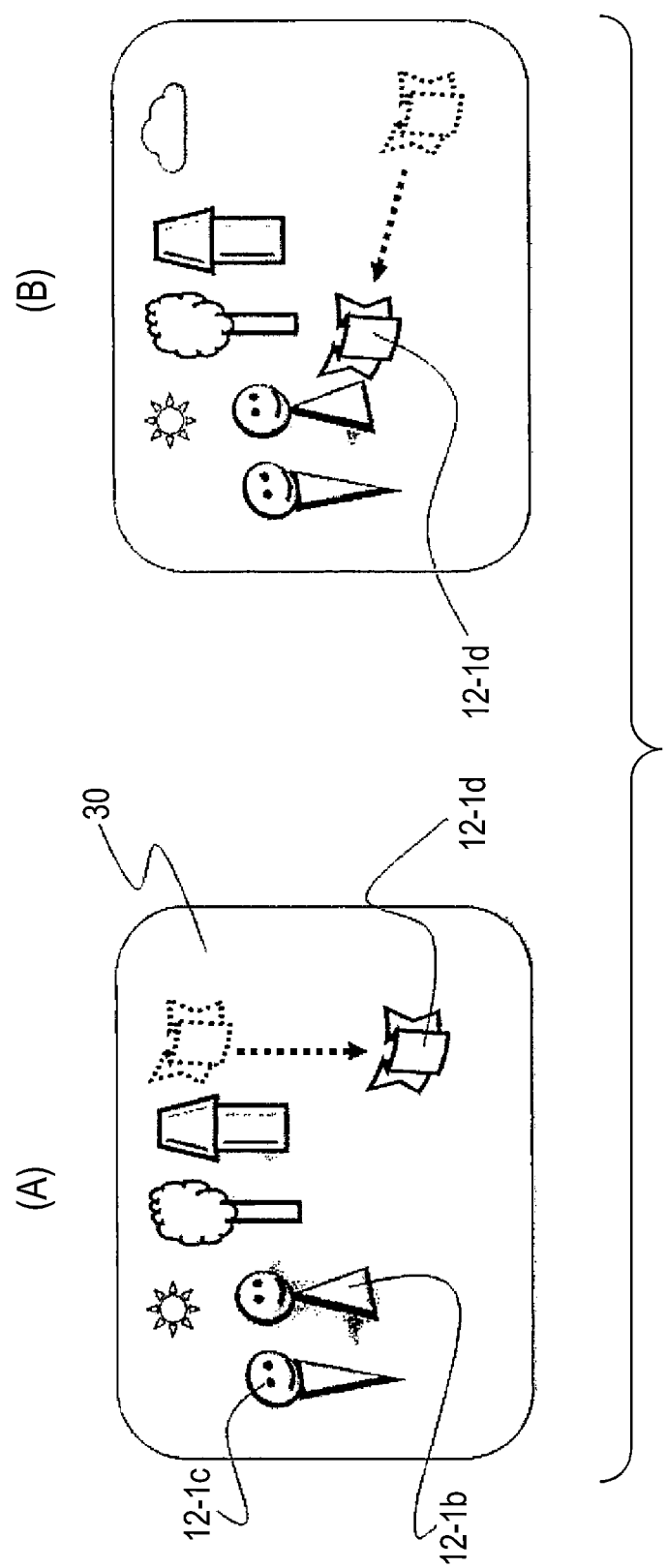
FIG. 17 is a schematic view illustrating an example in which a virtual object is added to a virtual space, in the content distribution receiving system of the invention.

Schematic views illustrated in FIG. 17 and FIG. 18 illustrate an aspect in which a ribbon-type virtual object 12-1d that is the virtual object (the virtual item) is thrown in the virtual space 30 by the viewer reproducing the content with the viewer terminal.

The ribbon-type virtual object 12-1d includes the specification data including image data of the appearance, the motion data including position data or direction data, and the like, and can be added to the virtual space 30 by the viewer with the viewer terminal or the like, in accordance with the same method described above in which the avatar 12-1b or 12-1c of the distributor or the viewer is added to the virtual space 30.

More specifically, in the system 1 of this example, the ribbon-type virtual object 12-1d is configured such that the specification data and the motion data of the virtual object are transmitted or stored by the same procedure and configuration as that of the specification information including the appearance information of the avatar (a substitution) of the distributor or the viewer, and the motion data (the operation information).

Accordingly, as with the avatar, specification information including appearance information, voice character information, sound effect information, or music information, and operation information (position information, direction and speed information of movement, posture information, and the like) can be included in the ribbon-type virtual object 12-1d that is a virtual object used in the throwing.

By setting the ribbon-type virtual object 12-1d to a virtual object for throwing to which the specification information including the appearance information, and the operation information are added, the ribbon-type virtual object 12-1d is capable of performing various productions for increasing the interest or the attention of the user. Note that, a virtual object to be thrown can be implemented as a virtual object including data such as various appearances, different from the ribbon-type virtual object 12-1d.

As an example of using the ribbon-type virtual object 12-1d, a schematic view illustrated in FIG. 17(A) indicates a production in which the ribbon-type virtual object 12-1d that is a virtual item thrown in the virtual space 30 falls from the top to the bottom and lands on the ground of the virtual space. Throwing the virtual object, for example, is common to a sense of throwing "Ohineri" onto the stage of the theater or throwing bouquet in a wedding, and such a production in which the virtual item falls to the bottom and lands on the ground of the virtual space 30 is a production of a natural sense and is easy to get the compathy of the viewer.

Similarly, a schematic view illustrated in FIG. 17(B) is a production in which when a target person who throws the virtual object, for example, is set to a first distributor 12-1b, and performs a predetermined manipulation by using the viewer terminal, the ribbon-type virtual object 12-1d thrown in the virtual space 30 is moved in the virtual space toward the first distributor 12-1b that is a target of the throwing. From the example of "Ohineri" described above, such a production can be a natural production.

Similarly, FIG. 18(A) is a production in which the ribbon-type virtual object 12-1d thrown in the virtual space 30 is automatically moved around the virtual space 30 (including flying) or is moved around the virtual space, in accordance with a manipulation of a person performing the throwing. Such a production is a considerably noticeable production, compared to a case where the virtual object after being thrown is still in the virtual space, and thus, is useful for the appeal of the throwing.

A schematic view illustrated in FIG. 18(B) is a production in which the number of ribbon-type virtual objects 12-1d thrown from a plurality of viewers increases or the same person continuously throws the plurality of virtual objects, the thrown objects are once stacked, and then, collapse. It is expected that the throwing of the virtual object is concentrated on a popular live content, a popular scene, and a popular performer, and such a production is likely to be attained and has a great effect on the production.

In desired measures on the production in a case of throwing the virtual object, including the respects described above, it is a good method to decide a target such as a specific performer and perform throwing on the manipulation, in addition to setting the target of the throwing to the overall live content. The virtual object that is thrown by specifying the target may be disposed near the target person or may be written with the name of the target person.

In addition, it is also desirable to dispose the thrown virtual object within a viewing field of the virtual camera.

It is configured to resolve each of the issues such as a demand for viewing and enjoying the live content later, which was not capable of being viewed when the live broadcasting was performed, a demand for obtaining a realistic sensation and a sense of immersion as if viewing the live content, even in the later viewing reproduction, or a demand for viewing and enjoying the live content while sharing the live content with the plurality of viewers, by decreasing a load on the communication network or each terminal hardware.

The invention can be implemented in various other forms, and various omissions, substitutions, and changes can be made within a range not departing from the gist of the invention. The embodiments and modifications thereof are included in the scope of the invention described in the claims and the equivalent scope thereof, as well as in the scope and gist of the invention.

The invention claimed is:

1. A three-dimensional content distribution system distributing content using a three-dimensional virtual space to a terminal for viewing to be provided for viewing, the system comprising:

a recording unit recording content data to a storage unit from a plurality of users including both specification data of each virtual object disposed in the three-dimensional virtual space and motion data relevant to an operation of each virtual object, wherein both the specification data and the motion data relevant to each virtual object are stored together in a server;
a first transmitting unit transmitting the specification data and the motion data, in accordance with a request for the terminal for viewing to perform the viewing; and
a second transmitting unit transmitting data including the motion data that is generated by a manipulation unit to the recording unit, including information of joints corresponding to each part of a body of a viewer and information of a ramus connecting the joints, according to a result of sensing a movement of the joints corresponding to each part of the body in order to allow an avatar to perform a desired operation, in order for the viewer to input the avatar that is each part of the body of the viewer itself into the content while viewing the content, by receiving the transmitted data, wherein rendering is performed, by the terminal, as live broadcasting of the content, based upon both the specification data and the motion data, with a switching manipulation for viewing the content in a plurality of viewpoints.

2. The three-dimensional content distribution system according to claim 1, wherein the recording unit further records third data relevant to a viewpoint of a virtual camera disposed in the three-dimensional virtual space.

3. The three-dimensional content distribution system according to claim 2, further comprising:
a change accepting unit generating new content data by performing a change for adding or correcting the specification data and the motion data, in accordance with a change request from the terminal for viewing that performs the viewing, to be provided for the subsequent viewing, wherein the change accepting unit further generates the new content data by performing a change for adding or correcting the third data, to be provided for the subsequent viewing.

4. The three-dimensional content distribution system according to claim 1, further comprising:
a change accepting unit generating new content data by performing a change for adding or correcting the specification data and the motion data, in accordance with a change request from the terminal for viewing that performs the viewing, to be provided for the subsequent viewing.

5. The three-dimensional content distribution system according to claim 1, further comprising:
a change accepting unit generating new content data by performing a change for adding or correcting the specification data and the motion data, in accordance with a change request from the terminal for viewing that performs the viewing; and a third transmitting unit configured to transmit data including the new content data in accordance with a request for a terminal different from the terminal to perform the viewing.

6. A three-dimensional content distribution method for distributing a content using a three-dimensional virtual space to a terminal for viewing to be provided for viewing, the method comprising:
recording content data to a storage unit from a plurality of users including both specification data relevant to a specification of each virtual object disposed in the three-dimensional virtual space and motion data relevant to an operation of each virtual object, wherein both the specification data and the motion data relevant to each virtual object are stored together in a server;
transmitting data including the specification data and the motion data, in accordance with a request for the terminal for viewing to perform the viewing;
transmitting data including the motion data that is generated by a manipulation unit to the recording unit, including information of joints corresponding to each part of a body of a viewer and information of a ramus connecting the joints, according to a result of sensing a movement of the joints corresponding to each part of the body in order to allow an avatar to perform a desired operation, in order for the viewer to input the avatar that is each part of the body of the viewer itself into the content while viewing the content, by receiving the transmitted data, wherein the recording unit records the specification data and the motion data from the terminal for viewing and from the plurality of users and updates data for displaying the three-dimensional virtual space stored in the storage unit to include the content data recorded from the users and the terminal for viewing; and
rendering, by the terminal, as live broadcasting of the content, based upon both the specification data and the motion data with a switching manipulation for viewing the content in a plurality of viewpoints.

7. The three-dimensional content distribution method according to claim 6, wherein in the recording step, third data relevant to a viewpoint of a virtual camera disposed in the three-dimensional virtual space is further recorded.

8. The three-dimensional content distribution method according to claim 7, further comprising:
generating new content data by performing a change for adding or correcting the specification data and the motion data, in accordance with a change request from the terminal for viewing that performs the viewing, to be provided for the subsequent viewing, wherein in the change accepting step, new content data is further generated by performing a change for adding or correcting the third data, to be provided for the subsequent viewing.

9. The three-dimensional content distribution method according to claim 6, further comprising:
generating new content data by performing a change for adding or correcting the specification data and the motion data, in accordance with a change request from the terminal for viewing that performs the viewing, to be provided for the subsequent viewing.

10. A computer program product embodied on a non-transitory computer readable medium for allowing a computer to execute the steps of:
recording content data to a storage unit from a plurality of users including both specification data relevant to a specification of each virtual object t disposed in a three-dimensional virtual space and motion data relevant to an operation of each virtual object, wherein both the specification data and the motion data relevant to each virtual object are stored together in a server;
transmitting data including the specification data and the motion data, in accordance with a request for a terminal for viewing to perform the viewing;
transmitting data including the motion data that is generated by a manipulation unit to the recording unit, including information of joints corresponding to each part of a body of a viewer and information of a ramus connecting the joints, according to a result of sensing a movement of the joints corresponding to each part of the body in order to allow an avatar to perform a desired operation, in order for the viewer to input the avatar that is each part of the body of the viewer itself into the content while viewing the content, by receiving the transmitted data, wherein the recording unit records the specification data and the motion data from the terminal for viewing and from the plurality of users and updates data for displaying the three-dimensional virtual space stored in the storage unit to include the content data recorded from the users and the terminal for viewing; and rendering, by the terminal, as live broadcasting of the content, based upon both the specification data and the motion data with a switching manipulation for viewing the content in a plurality of viewpoints.

* * * * *